US007028669B2

United States Patent
Nagashii et al.

(10) Patent No.: US 7,028,669 B2
(45) Date of Patent: Apr. 18, 2006

(54) FUEL INJECTION SYSTEM FOR ENGINE IN SMALL-TYPE VEHICLE

(75) Inventors: Toshihisa Nagashii, Wako (JP); Hiroshi Nakagome, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 10/813,728

(22) Filed: Mar. 30, 2004

(65) Prior Publication Data
US 2004/0216721 A1 Nov. 4, 2004

(30) Foreign Application Priority Data
Mar. 31, 2003 (JP) .................................. 2003-095108

(51) Int. Cl.
*F02M 55/02* (2006.01)

(52) U.S. Cl. ................................................ 123/470
(58) Field of Classification Search ................ 123/470, 123/472, 198 E
See application file for complete search history.

(56) References Cited
U.S. PATENT DOCUMENTS
2001/0020560 A1 * 9/2001 Yasui et al. .............. 184/6.22

2002/0063004 A1 * 5/2002 Nagasaka ................. 180/69.4
2003/0070661 A1 * 4/2003 Yasui ....................... 123/572
2004/0079340 A1 * 4/2004 Matsuda et al. ........... 123/472

FOREIGN PATENT DOCUMENTS
| EP | 1 081 369 | 3/2001 |
|---|---|---|
| EP | 1 096 138 | 5/2001 |
| JP | 7-332208 | 12/1995 |
| WO | WO 01/79690 | 10/2001 |

* cited by examiner

*Primary Examiner*—Thomas Moulis
(74) *Attorney, Agent, or Firm*—Merchant & Gould P.C.

(57) ABSTRACT

In a small-type vehicle including a cylinder head possessed by an engine main body mounted on a vehicle body frame, an intake passage portion extending rectilinearly so as to guide cleaned air from an air cleaner disposed on the upper side of the cylinder head, the intake passage portion being connected to an upper portion side wall of the cylinder head, an injector for injecting fuel into the intake passage portion from the upper side, the injector being attached to the air cleaner, and a fuel tank so disposed as to cover a rear portion and an upper portion of the air cleaner, to make it possible to secure a sufficient capacity of the fuel tank. The injector 100 is disposed on the front side relative the center line C1 of the intake passage portion 92.

4 Claims, 19 Drawing Sheets

FUEL INJECTION SYSTEM FOR ENGINE IN SMALL-TYPE VEHICLE

FIELD OF THE INVENTION

The present invention relates to a small-type vehicle including a cylinder head possessed by an engine main body mounted on a vehicle body frame, an intake passage portion extending rectilinearly so as to guide cleaned air from an air cleaner disposed on the upper side of the cylinder head, the intake passage portion being connected to an upper portion side wall of said cylinder head, an injector for injecting fuel into the intake passage portion from the upper side, the injector being attached to the air cleaner, and a fuel tank so disposed as to cover a rear portion and an upper portion of the air cleaner, and particularly to an improvement in a fuel injection system for an engine.

BACKGROUND OF THE INVENTION

Conventionally, a system in which an intake passage portion extends rectilinearly while connecting a cylinder head of an engine mounted on a motorcycle and an air cleaner disposed on the upper side of the cylinder head to each other and wherein fuel is injected from an injector disposed in the air cleaner has already been known, as disclosed, for example, in Japanese Patent Laid-open No. Hei 7-332208

In the above-mentioned conventional system, however, the injector is disposed on the center line of the intake passage portion, and on the center line of the intake passage portion, the bottom wall of a fuel tank must be set at a comparatively high position in order to obviate interference with the injector. In the conventional system, therefore, it has been difficult to secure a sufficient capacity of the fuel tank.

The present invention has been made in consideration of the foregoing. Accordingly, the present invention provides a fuel injection system for an engine in a small-type vehicle so designed that a sufficient capacity of a fuel tank can be secured.

SUMMARY OF THE INVENTION

In order to attain the above object, according to the invention, there is provided a fuel injection system for an engine in a small-type vehicle including a cylinder head possessed by an engine main body mounted on a vehicle body frame, an intake passage portion extending rectilinearly so as to guide cleaned air from an air cleaner disposed on the upper side of the cylinder head, the intake passage portion being connected to an upper portion side wall of the cylinder head, an injector for injecting a fuel into the intake passage portion from the upper side, the injector being attached to the air cleaner, and a fuel tank so disposed as to cover a rear portion and an upper portion of the air cleaner, wherein the injector is disposed on the front side relative to the center line of the intake passage portion.

According to the constitution of the invention, the injector is disposed at a position set off to the front side from the center line of the intake passage portion, so that, on the center line of the intake passage portion, the bottom wall of the fuel tank can be set at a comparatively low position while obviating interference with the injector. Therefore, it is possible to secure a sufficient capacity of the fuel tank.

In addition, the injector is disposed on the front side relative to the center line of an oil supply port provided at a front portion of the fuel tank. According to this constitution, the injector does not interfere with the fuel tank, on the center line of the oil supply port, so that it is possible to set the oil supply port at a further lower position.

The invention is further characterized in that the injector is attached to the air cleaner so that, on the projection onto a plain surface parallel to the center line of the oil supply port and the center line of the intake passage portion, an upper portion of the injector is disposed on the front side relative to the intersection of both the center lines. According to this constitution, the bottom wall of the fuel tank can be set at a further lower position on the front side of the center line of the oil supply port, and it is possible to secure a further sufficient capacity of the fuel tank.

Furthermore, a second injector for injecting the fuel into the intake passage portion is attached to a rear side portion of the intake passage portion. According to this constitution, the injector for injecting the fuel from the upper side of the intake passage portion so as to contrive to enhancement of engine output by supplying the fuel at a comparatively low temperature and the second injector capable of injecting the fuel with good response to the operation of the engine can be arranged while utilizing the arrangement space of the intake passage portion effectively and in good balance.

DETAILED DESCRIPTION OF THE INVENTION

Now, a mode for carrying out the present invention will be described below based on one embodiment of the present invention shown in the accompanying drawings.

Figure 1:
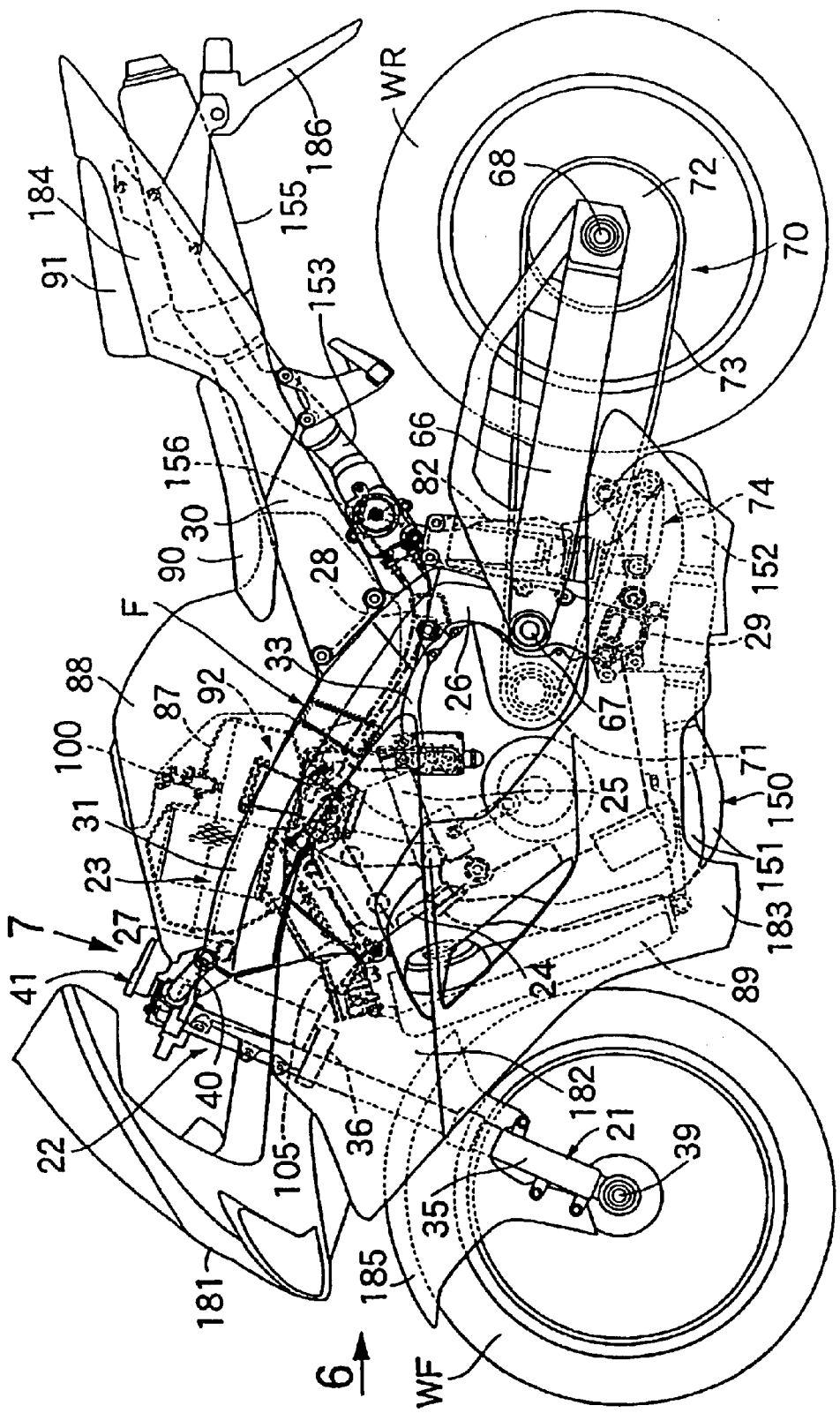
FIG. 1 is a side view of a motorcycle.
Figure 2:
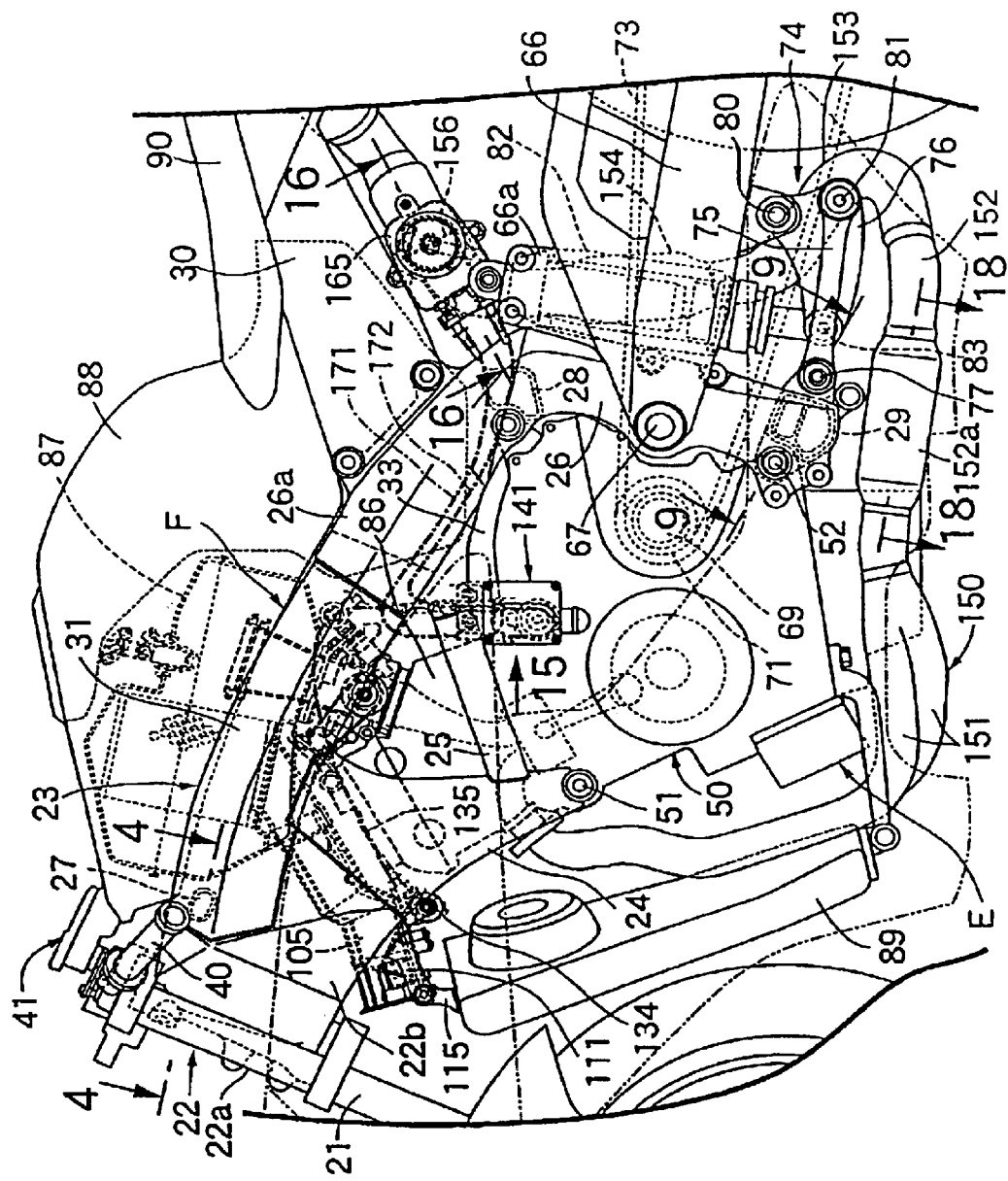
FIG. 2 is an enlarged view of an essential part of FIG. 1.
Figure 3:
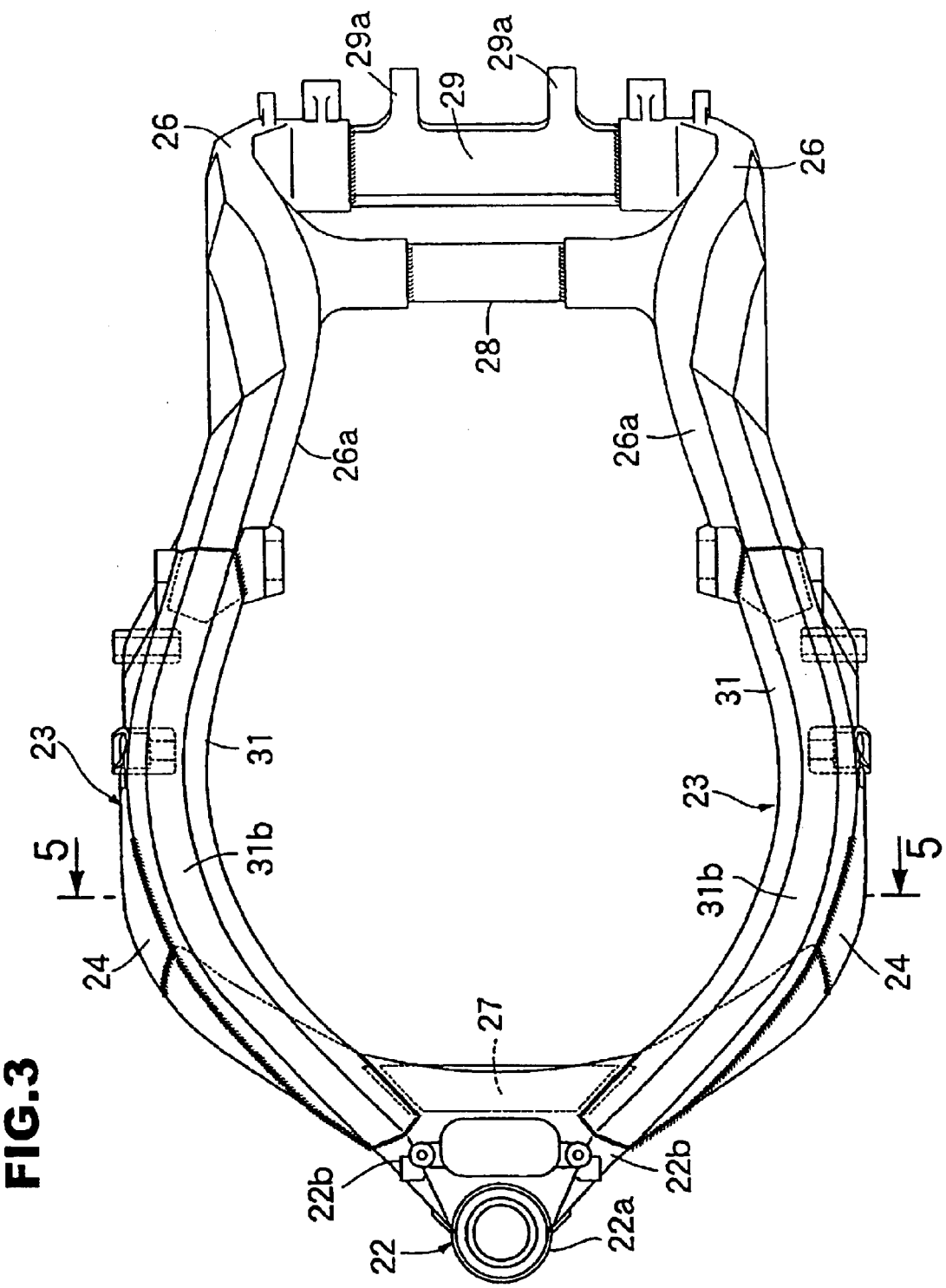
FIG. 3 is a plan view of a front portion of a vehicle body frame.

First, in FIGS. 1 to 3, a vehicle body frame F of this motorcycle includes a head pipe 22 for steerably bearing a front fork 21 for shaft-supporting a front wheel WF, a left-right pair of main frames 23 extending rearwardly downwards from the head pipe 22, a left-right pair of engine hangers 24 welded to the head pipe 22 and front portions of both the main frames 23 and extending downwards from the main frames 23, connecting pipes 25 for connection between lower portions of the engine hangers 24 and between support plate portions 33 provided at rear portions of the main frames 23, a left-right pair of pivot plates 26 extending downwards from rear portions of the main frames 23, a first cross pipe 27 bridgingly disposed between front portions of the main frames 23, a second cross pipe 28 bridgingly disposed between upper portions of both the pivot plates 26, a third cross pipe 29 bridgingly disposed between lower portions of both the pivot plates 26, and a left-right pair of seat rails 30 extending rearwardly upwards and connected to rear portions of both the main frames 23.

Figure 4:
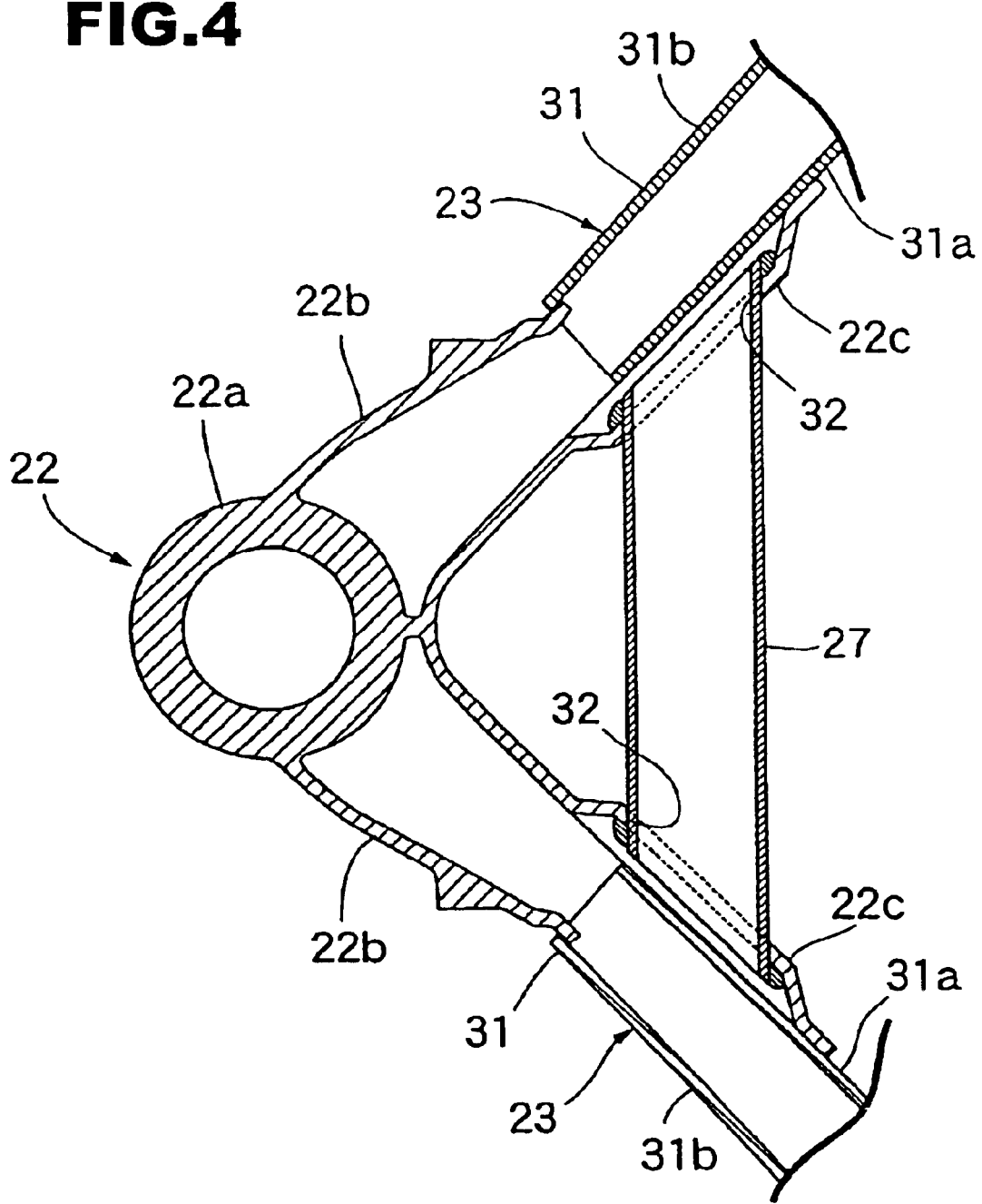
FIG. 4 is an enlarged sectional view of a front portion of the vehicle body frame taken along line 4—4 of FIG. 2.

In FIG. 4, the head pipe 22 includes a hollow cylindrical portion 22a steerably borne on the front fork 21, and a left-right pair of gussets 22b, 22b extending rearwardly downwards from the hollow cylindrical portion 22a. The main frame 23 is composed of the gusset 22b, a pipe member 31 having a front end portion welded to the gusset 22b, and a pipe portion 26a provided as one body with the pivot plate 26 and welded to a rear end portion of the pipe member 31.

In order to bridgingly dispose the first cross pipe 27 between the front ends of the main frames 23, 23, inside walls of the main frames 23, 23 are coaxially provided with mount holes 32, 32, and both end portions of the first cross pipe 27 passed through the mount holes 32, 32 are welded to the inside walls of both the main frames 23, 23.

Meanwhile, extended portions 22c, 22c extended rearwards so as to be disposed on the inner side relative to front portion inside walls of the pipe members 31, 31 are provided integral with the gussets 22b, 22b of the head pipe 22 so as to constitute front portion inside walls of the main frames 23, 23. The extended portions 22c, 22c are provided respectively with the mount holes 32, 32 for passing therethrough both end portions of the first cross pipe 27 with both ends thereof opposed to the front portion inside walls of the pipe members 31, 31, and both end portions of the first cross pipe 27 are welded to outside surfaces of both the extended portions 22c, 22c.

Figure 5:
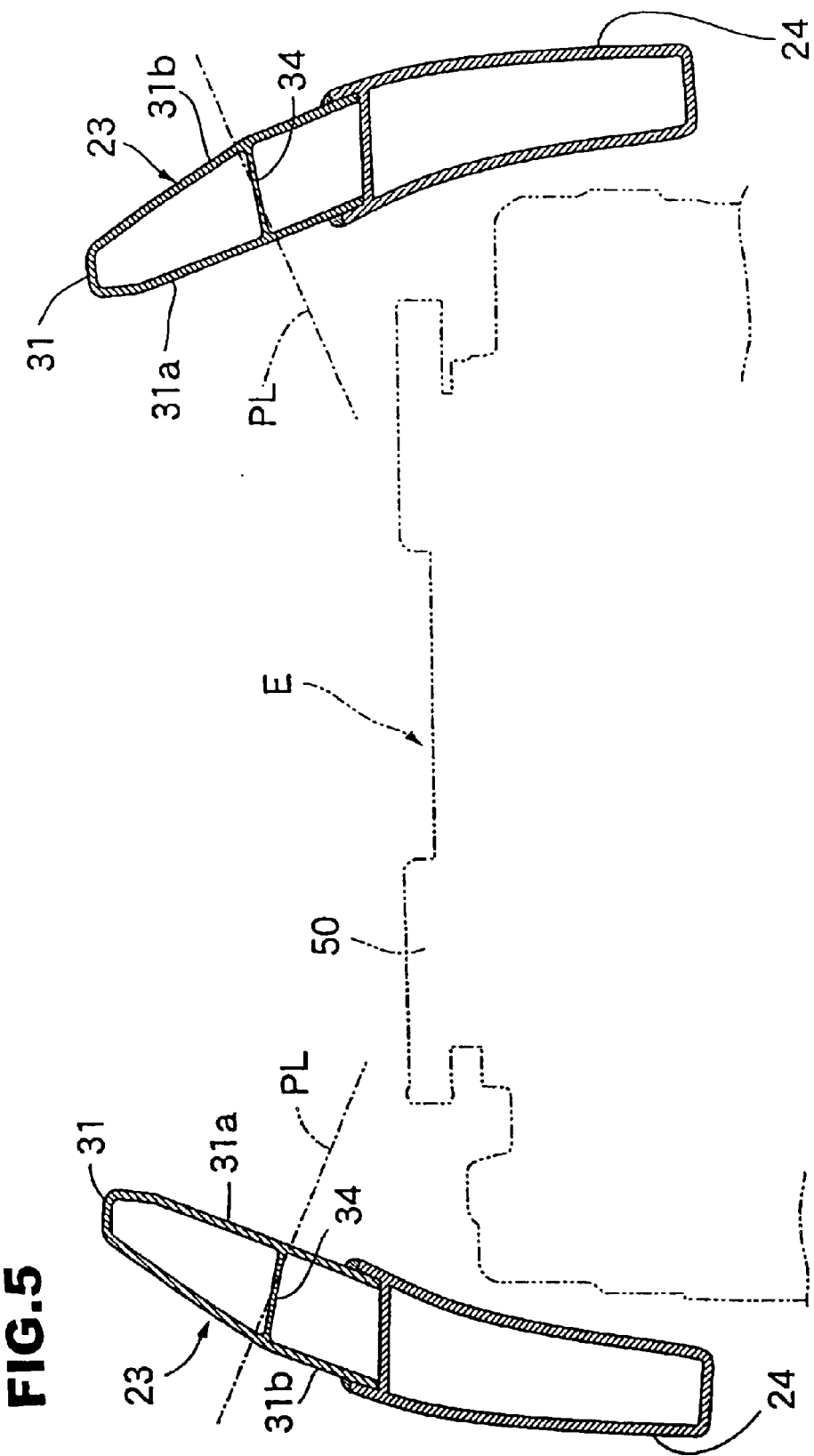
FIG. 5 is a sectional view taken along line 5—5 of FIG. 2.

Referring to FIG. 5 also, the pipe member 31 is formed to have an angular tubular cross-sectional outer shape by, for example, known extrusion or drawing of an aluminum alloy ingot. A rib 34 for partitioning the inside of the pipe member 31 into upper and lower portions is integrally provided between inside surfaces of an intermediate portion in the upper-lower direction of the pipe member 31. In this case, at the portion to which the engine hanger 24 is to be welded, a lower portion of the pipe member 31 is cut away so as to open toward the lower side, namely, toward the side of the engine hanger 24.

Meanwhile, the pipe member 31 is formed in a vertically elongate angular tubular shape having an inside wall 31a being flat over substantially the whole vertical length thereof, and an outside wall 31b substantially parallel to the inside wall 31a. The pipe member 31 is bent in a plain surface PL orthogonal to the inside wall 31a so that an intermediate portion thereof in the longitudinal direction is curved to be protuberant to the outer side. Moreover, both the pipe members 31, 31 after the bending are connected to the gussets 22b, 22b of the head pipe 22 in the state of being so inclined as to become closer to each other as the upper ends thereof are approached.

Figure 6:
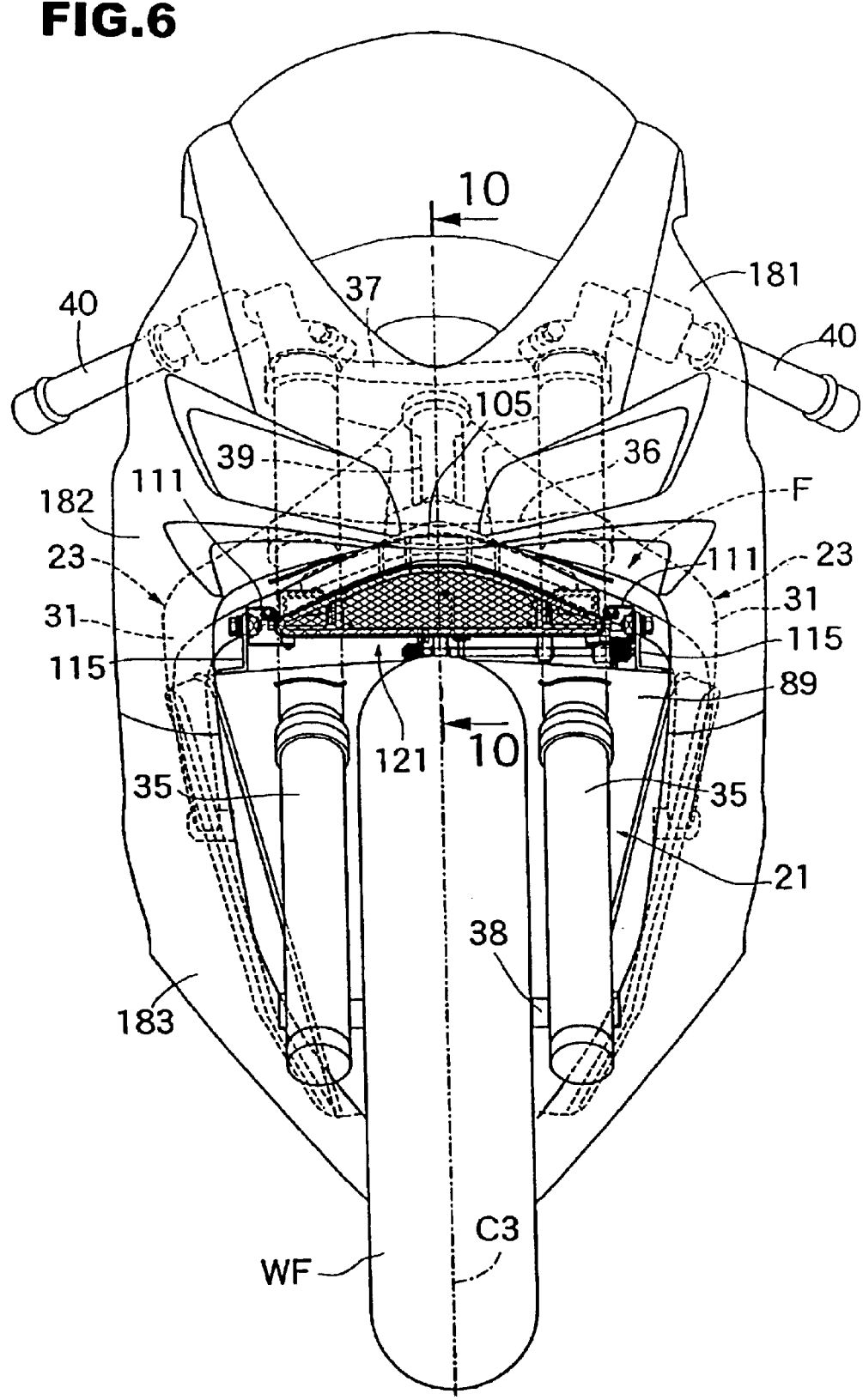
FIG. 6 is an enlarged view taken along arrow 6 of FIG. 1.

In FIG. 6, the front fork 21 includes cushion units 35, 35 extending vertically on both left and right sides of the front wheel WF, a bottom bridge 36 for connection between both the cushion units 35, 35 on the upper side of the front wheel WF, and a top bridge 37 for connection between upper portions of both the cushion units 35, 35. An axle 38 of the front wheel WF is shaft-supported between lower end portions of both the cushion units 35, 35.

Figure 7:
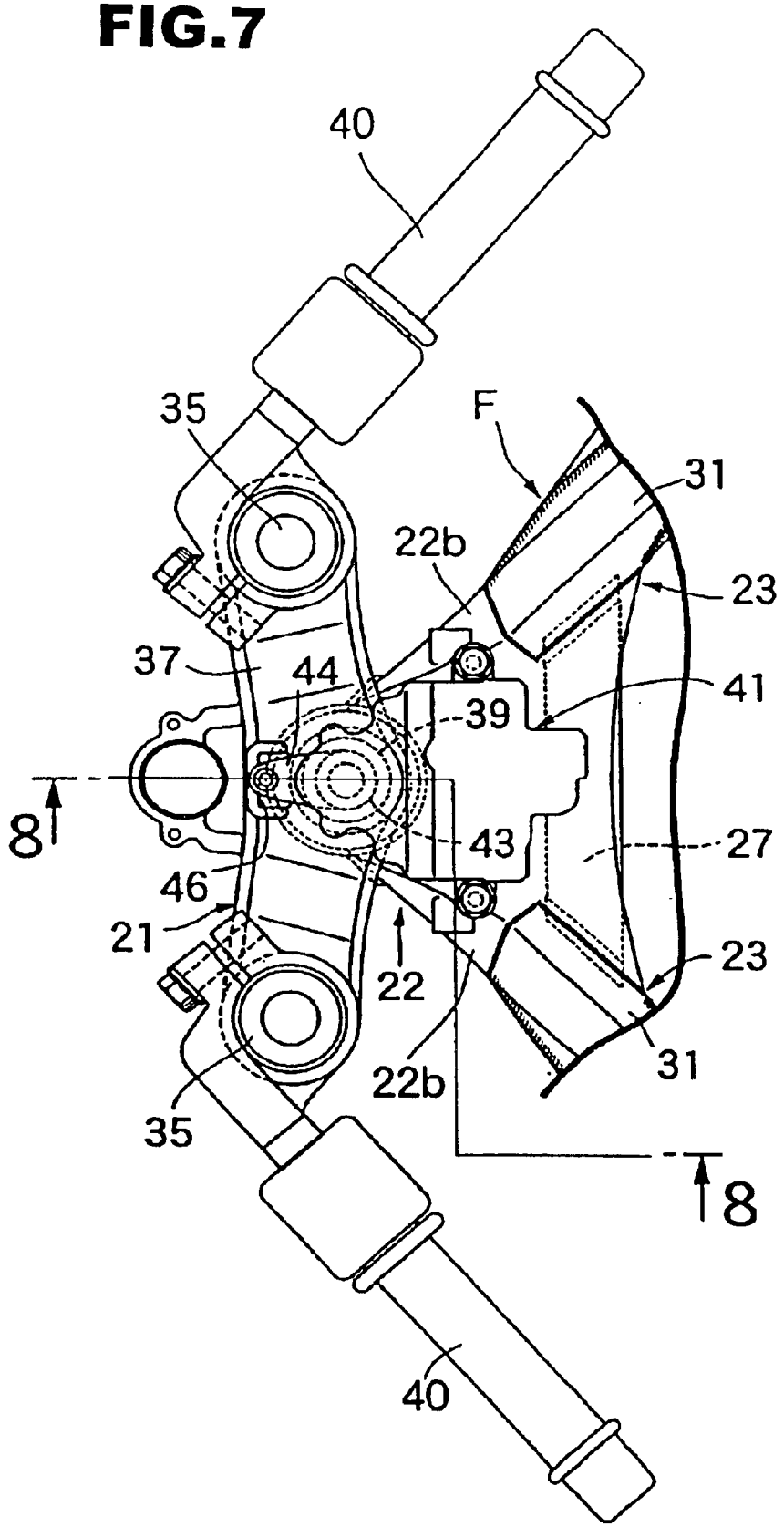
FIG. 7 is an enlarged view taken along arrow 7 of FIG. 1.
Figure 8:
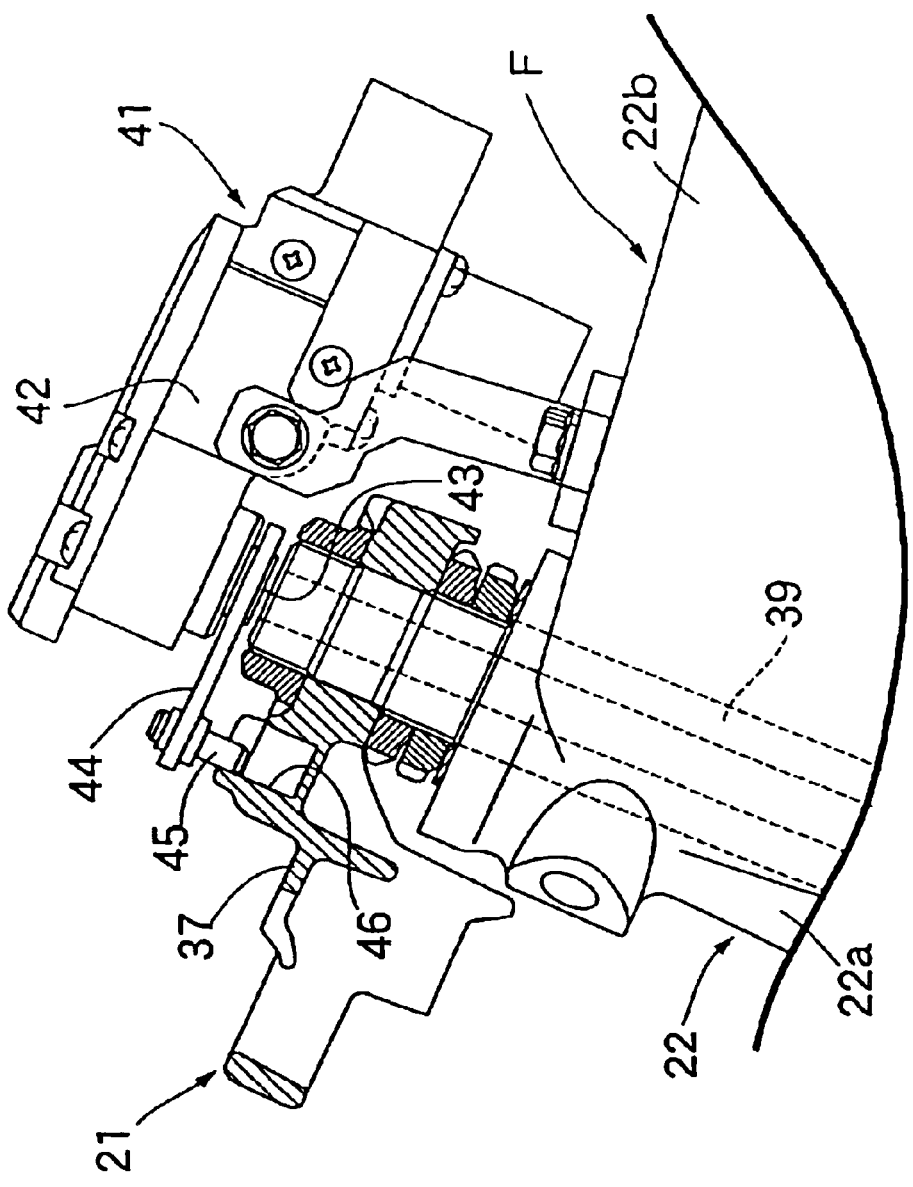
FIG. 8 is a sectional view taken along line 8—8 of FIG. 7.

Referring to FIGS. 7 and 8 also, a steering shaft 39 parallel to both the cushion units 35, 35 is provided between the bottom bridge 36 and the top bridge 37 on the rear side of a central portion of the space between both the cushion units 35, 35, and the steering shaft 39 is turnably borne on the hollow cylindrical portion 22a of the head pipe 22.

Left and right individual bar-like steering handles 40, 40 are connected to upper end portions of both the cushion units 35, 35 on the upper side of the bottom bridge 36. In addition, a steering damper 41 is provided between a front end portion of the vehicle body frame F, i.e., the head pipe 22, and the top bridge 37 of the front fork 21.

The steering damper 41 includes a housing 42 incorporating an oil hydraulic damping mechanism (not shown) therein and fixedly supported on the head pipe 22, a turning shaft 43 disposed coaxially with and on the upper side of the steering shaft 39 and turnably borne on the housing 42, an arm 44 having a base end portion fixed to the turning shaft 43 and extending forwards, an elastic roller 45 shaft-supported on the tip end of the arm 44, and a recessed portion 46 provided in the upper surface of a central portion of the top bridge 37 so that the outer circumferential surface of the elastic roller 45 is fitted in the recessed portion 46 in a frictional contact condition.

A turning vibration around the axis of the steering shaft 39, which is transmitted from the side of the front wheel WF to the top bridge 37, is attenuated by the oil hydraulic damping mechanism in the housing 42, by way of the arm 44.

Again in FIG. 2, an engine main body 50 of a multi-cylinder engine E having, for example, four cylinders arranged in parallel in the width direction of the vehicle body frame F is supported on lower portions of both engine hangers 24 and upper portions and lower portions of both the pivot plates 26.

The engine main body 50 is fastened to the lower portions of the engine hangers 24 through a left pair and a right pair of bolts 51.

Figure 9:
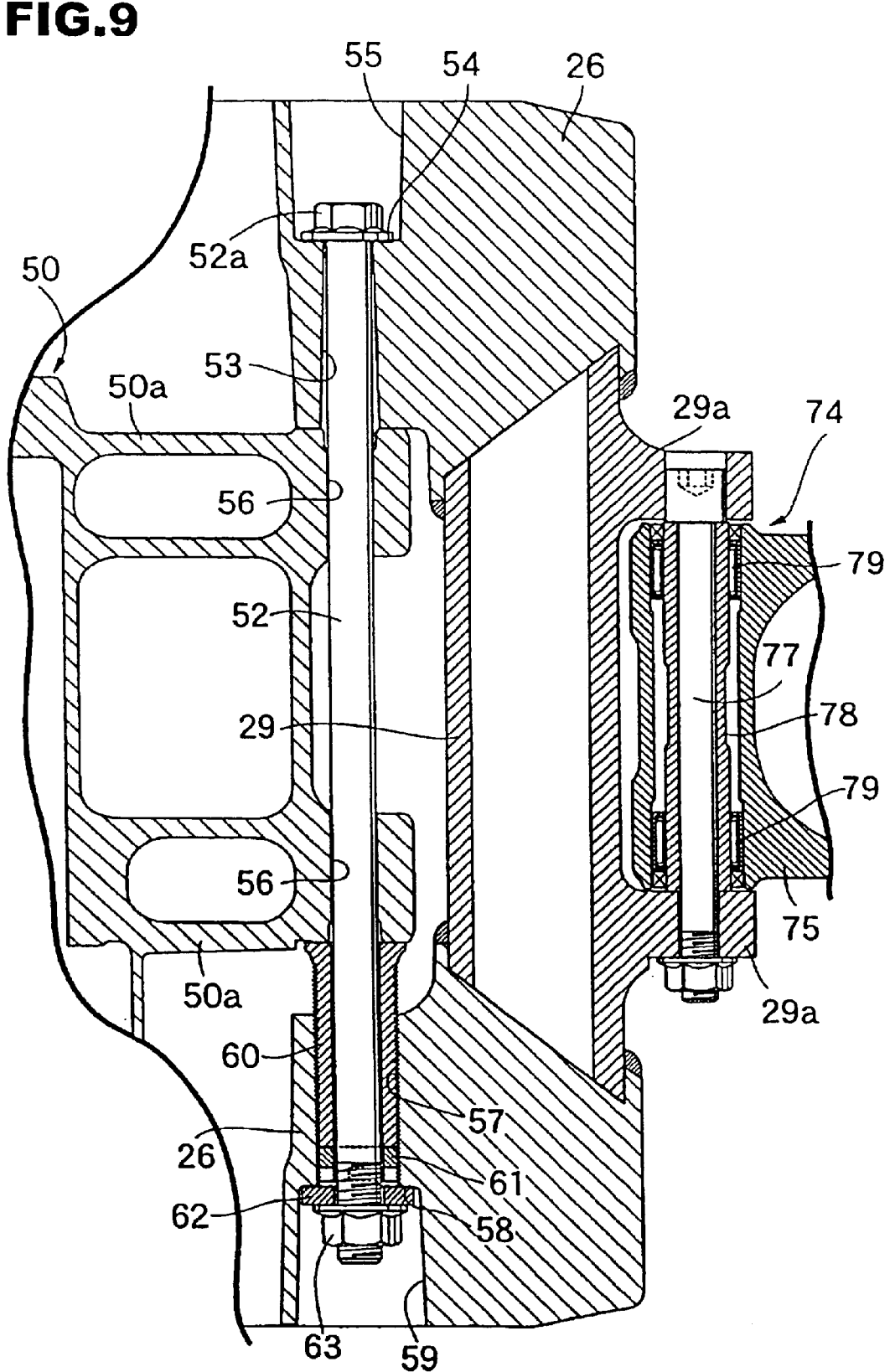
FIG. 9 is a sectional view taken along line 9—9 of FIG. 2.

In FIG. 9, in supporting the engine main body 50 on lower portions of the pair of pivot plates 26, 26 disposed on both sides of the engine main body 50, a lower portion of one of both the pivot plates 26, 26 (in this embodiment, the pivot plate 26 disposed on the right side as viewed from a person facing the forward side in the running direction of the motorcycle) is provided with a passing hole 53 for passing a mount bolt 52 therethrough, and with a first locking portion 54 surrounding the outer end of the insertion hole 53. Specifically, the lower portion of the pivot plate 26 on one side is coaxially provided with the passing hole 53 opening in the inside surface thereof and with a first insertion hole 55 larger in diameter than the passing hole 53 and opening in the outside surface thereof, and the first locking portion 54 is formed as an annular step portion fronting on the side of the first insertion hole 55, between the outer end of the passing hole 53 and the inner end of the first insertion hole 55.

In addition, the engine main body 50 is integrally provided with a pair of support arm portions 50a, 50a disposed between both the pivot plates 26 and 26, with a spacing therebetween along the axial direction of the mount bolt 52, and the support arm portions 50a, 50a are coaxially provided with through-holes 56, 56 for passing the mount bolt 52 therethrough.

A lower portion of the pivot plate 26 on the other side is provided with a screw hole 57 coaxial with the passing hole 53, and with a second locking portion 58 surrounding the outer end of the screw hole 57. Specifically, the lower portion of the pivot plate 26 on the other side is coaxially provided with the screw hole 57 opening in the inside surface thereof and with a second insertion hole 59 larger in diameter than the screw hole 57 and opening in the outside surface thereof, and the second locking portion 58 is formed as an annular step portion fronting on the side of the second insertion hole 59, between the outer end of the screw hole 57 and the inner end of the second insertion hole 59.

A hollow cylindrical bolt 60 having one end to be in contact with the engine main body 50 is screw-engaged with the screw hole 57. Specifically, in the condition where the support arm portion 50a on one side is in contact with the inside surface of the pivot plate 26 on one side, the hollow cylindrical bolt 60 is screw-engaged with the screw hole 57 so that one end thereof is brought into contact with the support arm portion 50a on the other side, and a hollow cylindrical stop bolt 61 coming into contact with the other end of the hollow cylindrical bolt 60 to prevent the hollow cylindrical bolt 60 from slackening is screw-engaged with the screw hole 57. In addition, the hollow cylindrical bolt 60 and the stop bolt 61 are screw-engaged with the screw hole 57 so that the other end of the hollow cylindrical bolt 60 and the stop bolt 61 are located on the inner side relative to the second locking portion 58 in the condition where the engine main body 50 is clamped between the inside surface of the pivot plate 26 on one side and one end of the hollow cylindrical bolt 60.

The mount bolt 52 is passed through the passing hole 53, both the through-holes 56, 56 in the engine main body 50, the hollow cylindrical bolt 60, the stop bolt 61, and the screw hole 57. An enlarged-diameter head portion 52a at one end of the mount bolt 52 is engaged with one of the first and second locking portions 54 and 58, and a nut 63 to be engaged with the other of the first and second locking portions 54 and 58 is screw-engaged with the other end portion of the mount bolt 52. In this embodiment, the other end portion of the mount bolt 52 having the enlarged-diameter head portion 52a engaged with the first locking portion 54 projects from the screw hole 57, and the nut 63 screw-engaged to the other end portion of the mount bolt 52 at the portion projecting from the screw hole 57 is engaged with the second locking portion 58, with a washer 62 therebetween.

A structure for supporting the engine main body 50 onto upper portions of both the pivot plates 26, 26 is basically the same as the above-described structure for supporting the engine main body 50 onto the lower portions of the pivot plates 26, 26, so that detailed description thereof is omitted.

A front end portion of a swing arm 66 is oscillatably borne on intermediate portion in the vertical direction of both the pivot plates 26, 26, through a support shaft 67, and an axle 68 of a rear wheel WR is rotatably borne on a rear end portion of the swing arm 66.

Power from an output shaft 69 of a transmission incorporated in the engine main body 50 is transmitted to the rear wheel WR through a chain transmission means 70. The chain transmission means 70 is composed of a drive sprocket 71 fixed to the output shaft 69, a driven sprocket 72 fixed to the rear wheel WR, and an endless chain 73 wrapped around the sprockets 71 and 72, and is disposed on the left side of the engine E as viewed from a person facing the forward side in the running direction of the motorcycle.

A link mechanism 74 is provided between the third cross pipe 29, which connects the lower portions of both the pivot plates 26, 26 to each other, and the swing arm 66. The link mechanism 74 includes a first link 75 having one end portion connected to the third cross pipe 29 so as to be turnable around the axis of a first connection shaft 77 parallel to the support shaft 67, and a second link 76, which is connected to a lower portion of the swing arm 66 so as to be turnable around the axis of a second connection shaft 80 parallel to the first connection shaft 77 and which is connected to the other end portion of the first link 75 through a third connection shaft 81 parallel to the first and second connection shafts 77 and 80.

The third cross pipe 29 is integrally provided with a pair of shaft support portions 29a, 29a projecting toward the rear side at two positions spaced from each other in the longitudinal direction thereof. One end portion of the first link 75 is borne on a collar 78 attached to the first connection shaft 77 provided between both the shaft support portions 29a, 29a, through a pair of roller bearings 79, 79.

Besides, the other end portion of the first link 75 is connected to a rear portion of the second link 76 through the third connection shaft 81, and a lower end portion of a rear cushion unit 82 having an upper end portion connected to a bracket 66a provided at a front portion of the swing arm 66 is connected to a front portion of the second link 76 through a fourth connection shaft 83.

Figure 10:
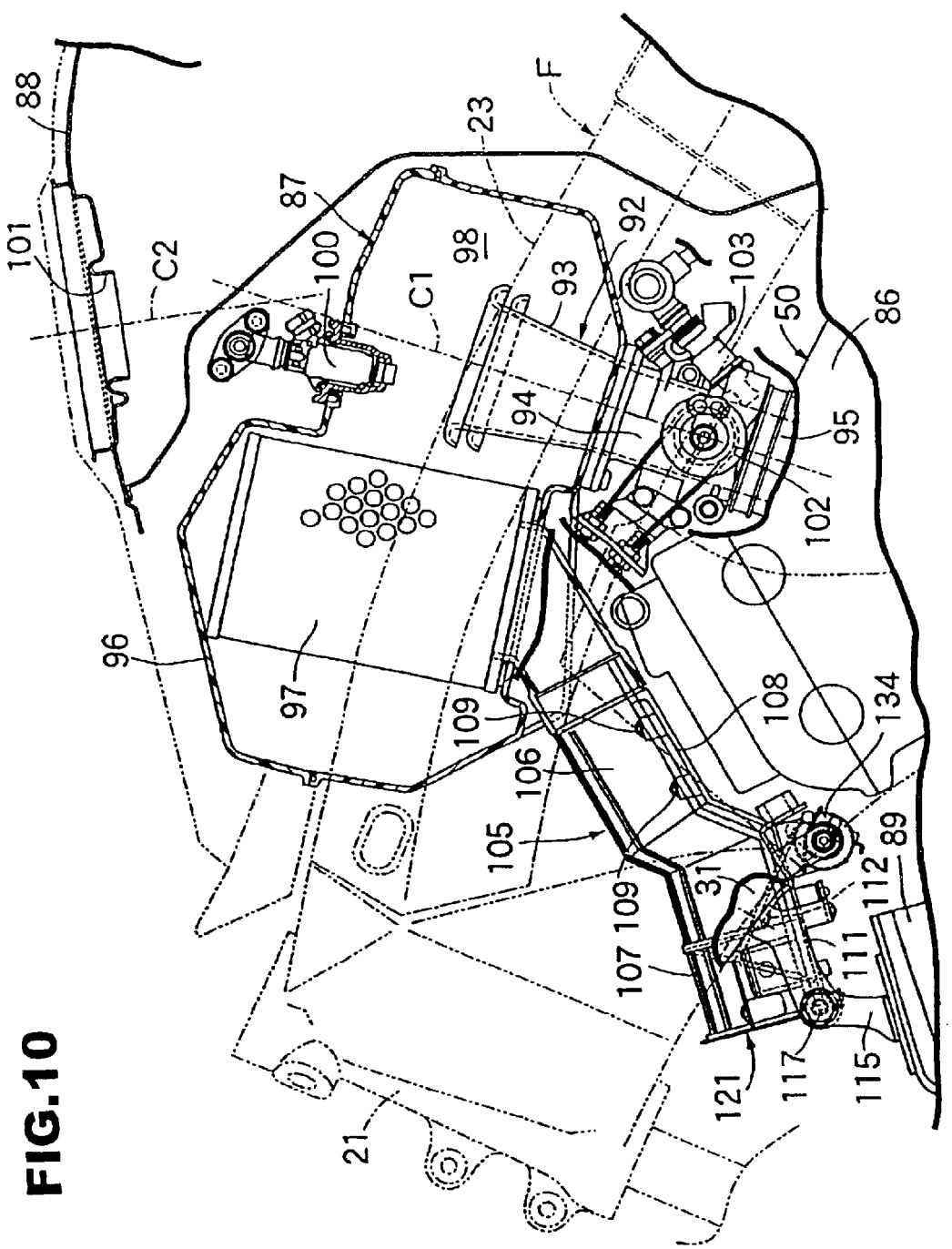
FIG. 10 is a sectional view taken along line 10—10 of FIG. 6.
Figure 11:
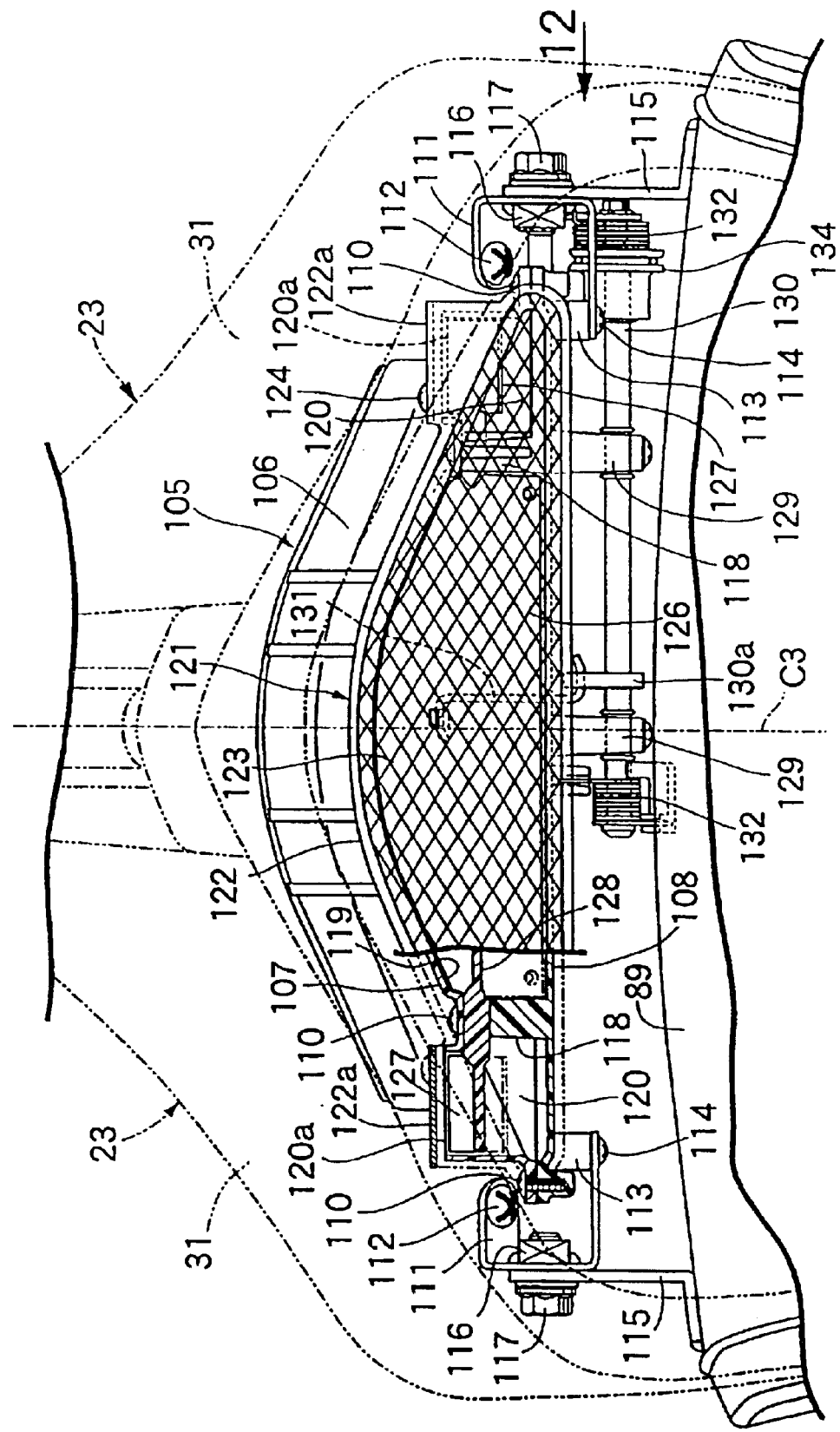
FIG. 11 is an enlarged view of an essential part of FIG. 6.
Figure 12:
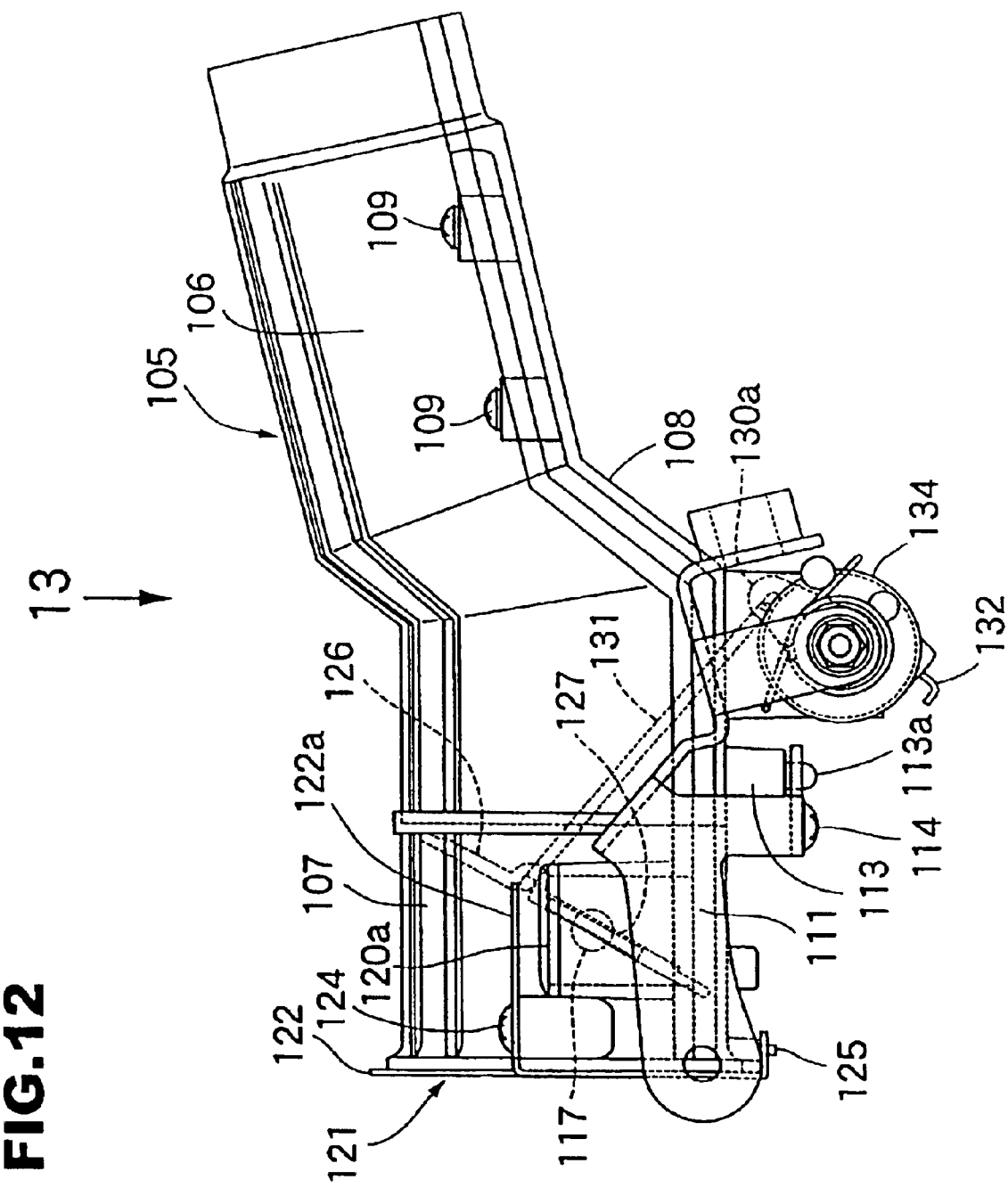
FIG. 12 is a view taken along arrow 12 of FIG. 11.
Figure 13:
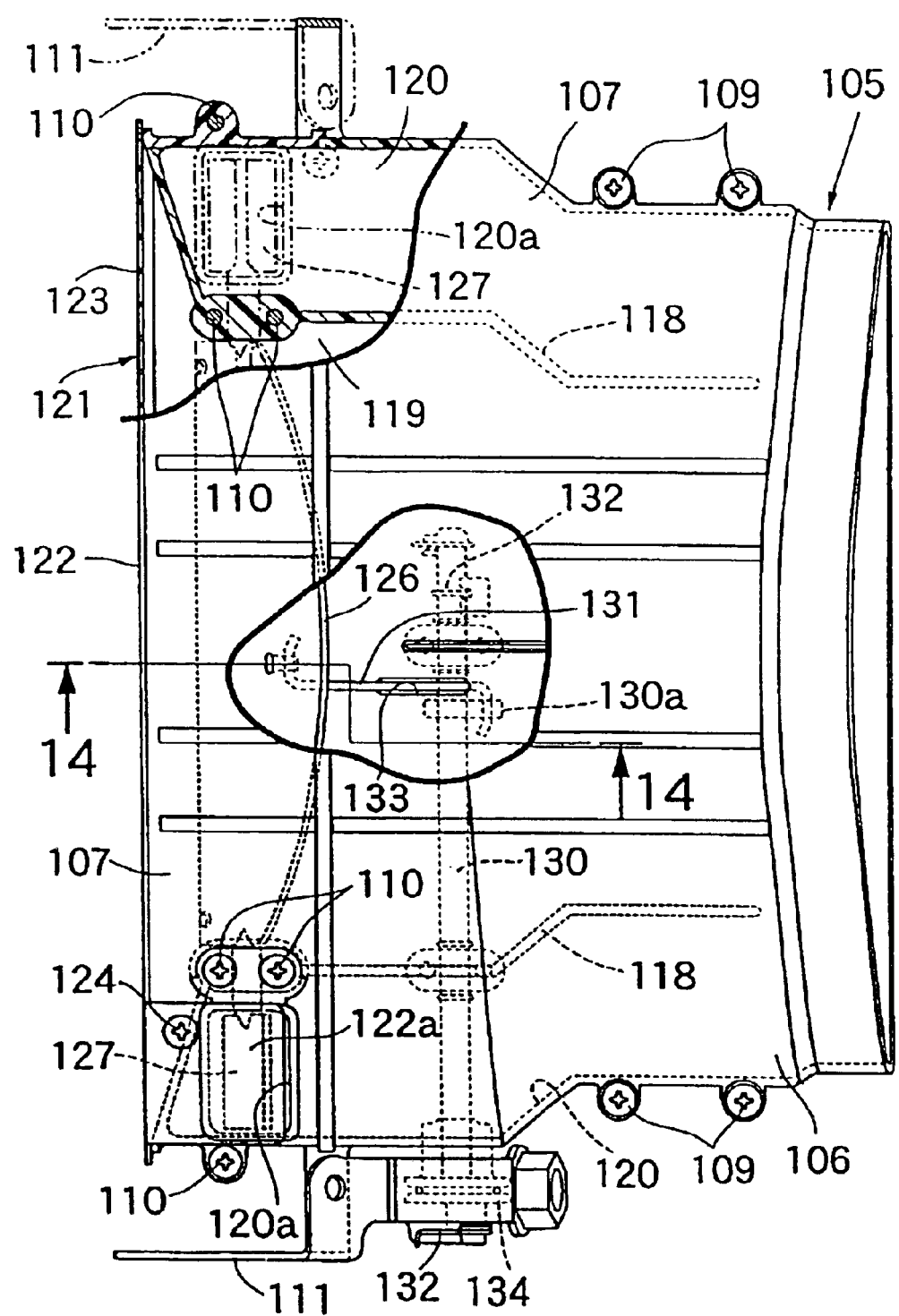
FIG. 13 is a partly cut-away cross-sectional plan view taken along arrow 13 of FIG. 12.

Referring to FIG. 10 also, an air cleaner 87 for cleaning air supplied to the engine E is disposed on the upper side of a cylinder head 86 of the engine main body 50 so as to be located on the rear side of the head pipe 21 of the vehicle body frame F, a fuel tank 88 covering a rear portion and an upper portion of the air cleaner 87 is mounted on both the main frames 23 of the vehicle body frame F, and a radiator 89 is disposed on the front side of the engine main body 50. As shown in FIG. 2, a main seat 90 for seating the rider thereon is supported on the seat rails 30 on the rear side of the fuel tank 88, and a pillion seat 91 for seating the passenger thereon is supported on the seat rails 30 at a position spaced rearwards from the main seat 90.

Intake passage portions 92 extending rectilinearly so as to guide cleaned air from the air cleaner 87 on the upper side of the cylinder head 86 are connected to an upper portion side wall of the cylinder head 86 with respect to each cylinder 86. The intake passage portion 92 includes a funnel 93 having an open upper end portion projected into the air cleaner 87, and a throttle body 94 connected to the lower end of the funnel 93. The throttle body 94 is connected to the upper portion side wall of the cylinder head 86 through an insulator 95.

On the other hand, the air cleaner 87 includes a hollow cylindrical cleaner element 97 fixedly contained in a cleaner case 96. In the cleaner case 96, a clean chamber 98 into which air cleaned by passing through the cleaner element 97 is introduced is formed in the surroundings of the cleaner element 97, and the funnels 93 at the upstream ends of the individual intake passage portions 92 are attached, in parallel, to the cleaner case 96 so as to open into the clean chamber 98.

Meanwhile, a first injector 100 for injecting a fuel at the time of high-speed rotation of the engine E is attached to the cleaner case 96 of the air cleaner 87 on the basis of each cylinder of the engine E. The first injectors 100 are disposed on the front side relative to the center lines C1 of the intake passage portions 92, and are attached to the cleaner case 96 so as to have axes inclined against the center lines C1. Moreover, a fuel pump (not shown) is incorporated in the fuel tank 88, and the fuel is supplied from the fuel pump to the first injectors 100.

In addition, the fuel tank 88 is provided with an oil supply port 101 at a front portion thereof. The first injectors 100 are disposed on the front side relative to the center line C2 of the oil supply port 101. The first injectors 100 are attached to the cleaner case 96 so that, on the projection onto a plain surface parallel to the center line C2 of the oil supply port 101 and the center lines C1 of the intake passage portions 92, upper portions of the first injectors 100 are disposed on the front side relative to the intersection P of both the center lines C1 and C2.

Throttle valves (not shown) for controlling the quantities of air circulated through the intake passage portions 92 are incorporated in the throttle bodies 94 of the intake passage portions 92, and a throttle drum 102 connected to the throttle valve is disposed on a lateral side of the throttle body 94.

Moreover, second injectors 103 for receiving the fuel from the fuel pump in the fuel tank 88 and injecting the fuel in the operating condition of the engine E are attached to rear side portions of the throttle bodies 94 on the side of the engine E relative to the throttle valves.

Referring to FIGS. 11 to 14 also, on the lower side of the head pipe 21 provided at the front end of the vehicle body frame F, an intake duct 105 for introducing the outside air into the air cleaner 87 is disposed so as to extend forwards from the air cleaner 87. A rear end portion of the intake duct 105 is projected into and fixed to a lower portion of the cleaner case 96 so as to introduce the outside air into the cleaner element 97 in the air cleaner 87.

The intake duct 105 is composed of a rear duct main body 106 having a roughly triangular cross-sectional shape of which a central portion in the width direction is protuberant upwards and which is opened on the lower side, a front duct main body 107 having substantially the same cross-sectional shape as that of the rear duct main body 106 and joined to a front portion of the rear duct main body 106, and a lower lid plate 108 closing the lower open ends of the front and rear duct main bodies 106 and 107. The intake duct 105 is so formed that a rear portion thereof is inclined rearwardly upwards, in side view. The lower lid plate 108 is fastened to the rear duct main body 106 through a plurality of screw members 109, and to the front duct main body 107 through a plurality of screw members 110.

Support stays 111, 111 are fixed, by screw members 112, to the lower surfaces of front portions of the pipe members 31, 31, which constitute parts of the main frames 23, 23 of the vehicle body frame F, and mount bosses 113, 113 attached to both side lower portions of a front portion of the intake duct 105 are fastened to the support stays 111, 111 by screw members 114, 114, whereby the front portion of the intake duct 105 is supported on the vehicle body frame F. Moreover, positioning pins 113a to be passed through the support stays 111 are projected on the mount bosses 113.

In addition, the radiator 89 is disposed on the lower side of the intake duct 105, and stays 115, 115 are extended upwards from both sides of the radiator 89. On the other hand, welded nuts 116, 116 are attached to the support stays 111, 111, and bolts 117, 117 passed through the stays 115, 115 and the support stays 111, 111 are screw-engaged with the welded nuts 116, 116 and are fastened, whereby the radiator 89 is supported on the vehicle body frame F.

The lower lid plate 108 of the intake duct 105 is integrally provided with a pair of partition walls 118, 118 which make contact with the lower surfaces of upper portions of the front and rear duct main bodies 106 and 107. A first intake passage 119 whose central portion in the width direction is disposed on the center line C3 in the width direction of the front wheel WF and a left-right pair of second intake passages 120, 120 disposed on both sides of the first intake passage 119 are formed in the intake duct 105 so that the first intake passage 119 and the second intake passages 120, 120 are partitioned from each other by the partition walls 118, 118. The circulation area of the first intake passage 119 is set to be greater than the total circulation area of the pair of second intake passages 120, 120.

Moreover, both front portions of the partition walls 118, 118 are formed inclinedly so that they are spaced farther away from each other toward the front side, front end portions of both the partition walls 118, 118 make contact with the inside surfaces of both side walls of the front duct main body 107, and a front portion of the first intake passage 119 opens forwards at the front end of the intake duct 105 while occupying the whole of a front end opening portion of the intake duct 105. In addition, front end opening portions 120a of the second intake passages 120, 120 is formed at a front end portion of the intake duct 105 so as to open in a direction different from the opening direction of the front end of the first intake passage 119; in this embodiment, the front end opening portions 120a are formed in the front duct main body 107 so as to open upwards on both left and right sides of the front end portion of the first intake passage 119.

The front end portion of the intake duct 105 is formed in a roughly triangular shape with its upper edges set along the lower end edges of connection portions of the head pipe 21 and both the main frames 23, 23, and with its lower edge portion set along an upper portion of the radiator 89, when viewed from the front side. A grille 121 is attached to the front end portion of the intake duct 105.

The grille 121 includes a net-like member 123 of which a peripheral edge portion is supported on a frame member 122 having a shape corresponding to the opening edge of the front end of the intake duct 105. The frame member 122 is integrally provided with baffle plates 122a, 122a, which are disposed at positions spaced from the front end opening portions 120a of the second intake passages 120, 120 so as to form gaps between themselves and the front end opening portions 120a. The baffle plates 122a, 122a are fastened to both sides of a front portion of the front duct main body 107 of the intake duct 105 by screw members 124, 124. In addition, positioning pins 125 for inhibiting a lower portion of the frame member 122 from being disengaged from the front end portion of the intake duct 105 are projected on the front end of the lower lid plate 108 so as to be passed through a lower portion of the frame member 122.

A butterfly type first intake control valve 126 controllably opened and closed according to the rotating speed of the engine E, so as to close the first intake passage 119 at the time of low-speed rotation of the engine E and to open the first intake passage 119 at the time of high-speed rotation of the engine E, is disposed in the first intake passage 119. In addition, butterfly type second intake control valves 127 controllably opened and closed according to the rotating speed of the engine E, so as to open the second intake passages 120 at the time of low-speed rotation of the engine E and to close the second intake passages 120 at the time of high-speed rotation of the engine E, are disposed in the second intake passages 120. The first intake control valve 126 and the second intake control valves 127 are fixed in common to a valve shaft 128, which is turnably borne on the intake duct 105 while having an axis orthogonal to the air circulation direction circulated through the first intake passage 119.

The valve shaft 128 is turnably borne by the partition walls 118, 118 at those portions of the intake duct 105, which correspond to the front end opening portions 120a of the second intake passages 120. Of a plurality of the screw members 110 for fastening the front duct main body 107 to the lower lid plate 108, two pairs of screw members 110, 110 are screwed into the partition walls 118, 118 at positions on opposite sides of the valve shaft 128.

Figure 14:
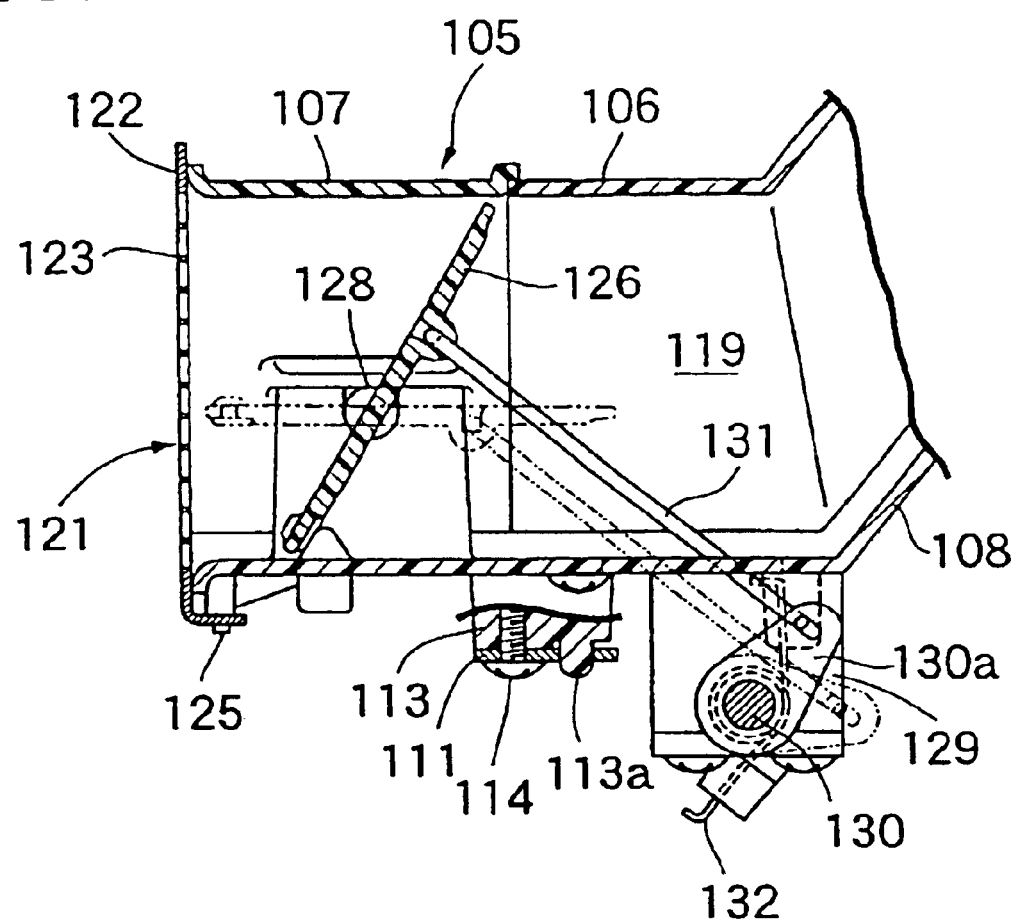
FIG. 14 is a sectional view taken along line 14—14 of FIG. 13.

The first intake control valve 126 for varying the circulation area of the first intake passage 119 is fixed to the valve shaft 128 so as to be inclined rearwardly upwards in the state of closing the first intake passage 119, as shown in FIG. 14. Moreover, the first intake control valve 126 is so formed that, in its valve-closing state, the area of its portion on the upper side relative to the valve shaft 128 is greater than the area of its portion on the lower side relative to the valve shaft 128. In addition, the first intake control valve 126, in its valve-opening state, is substantially horizontal as indicated by chain lines in FIG. 14 so that its resistance to air circulated through the first intake passage 119 is minimized.

The second intake control valves 127 for varying the circulation areas of the second intake passages 120 are fixed to the valve shaft 128 in such a manner as to open the front end opening portions 120a of the second intake passages 120 in the condition where the first intake control valve 126 closes the first intake passage 119.

A turning shaft 130 parallel to the valve shaft 128 is disposed on the lower side in the intake duct 105 on the rear side relative to the valve shaft 128. The turning shaft 130 is turnably borne on a plurality of bearing portions 129 projected on the lower surface of the intake duct 105, i.e., the lower surface of the lower lid plate 108.

The turning shaft 130 is provided with an arm 130a at a portion thereof corresponding to the first intake passage 119. A connection rod 131 penetrating through the lower portion of the intake duct 105, i.e., through the lower lid plate 108 has one end connected to that portion of the first intake control valve 126 in the valve-closing state, which is located on the upper side relative to the valve shaft 128, and the other end of the connection rod 131 is connected to the arm 130a. Therefore, the first intake control valve 126 is turned between the valve-closing position indicated by solid lines in FIG. 14 and the valve-opening position indicated by the chain lines in FIG. 14, according to the turning of the turning shaft 130.

Moreover, return springs 132, 132 for applying spring forces for rotatively biasing the turning shaft 130 and the valve shaft 128 in the direction for moving the first intake control valve 126 toward the valve-closing position are provided between both end portions of the turning shaft 130 and the intake duct 105. Besides, the connection rod 131 movably penetrates through a through-hole 133 formed in the lower lid plate 108. The through-hole 133 is formed to be elongate in the front-rear direction so that the position of penetration of the connection rod 131 through the lower lid plate 108 is moved in the front-rear direction according to the turning of the arm 130a together with the turning shaft 130.

A driven pulley 134 is fixed to one end of the turning shaft 130. A turning force is transmitted from an actuator 141, which is supported on one of the support plate portions 33 provided at rear portions of the main frames 23 and is disposed on the left side of an upper portion of the engine main body 50, to the driven pulley 134 through a first transmission wire 135.

Figure 15:
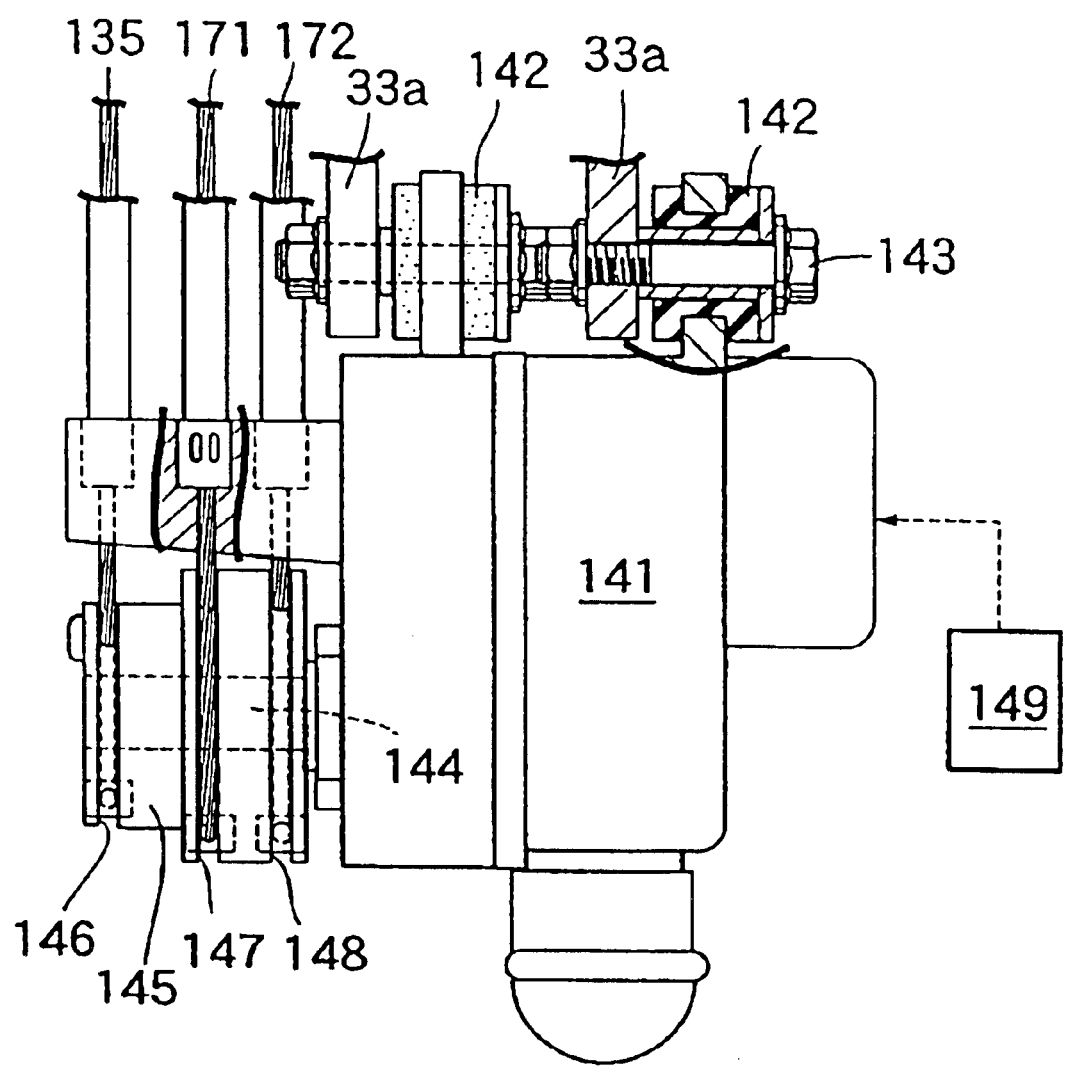
FIG. 15 is an enlarged view taken along arrow 15 of FIG. 12.

In FIG. 15, the actuator 141 is composed of an electric motor capable of forward rotation and reverse rotation, and a speed reduction mechanism for reducing the speed of the output of the electric motor. The actuator 141 is mounted to a pair of brackets 33a, 33a provided on the one support plate portion 33 of the vehicle body frame F, through elastic members 142, 142 by a bolt 143. A drive pulley 145 attached to an output shaft 144 possessed by the actuator 141 is provided with a small-diameter first wire groove 146 and large-diameter second and third wire grooves 147 and 148.

An end portion of the first transmission wire 135 for transmitting a turning force to the driven pulley 134 on the side of the intake duct 105 is wrapped around and engaged with the first wire groove 146.

An electronic control unit 149 is connected to the actuator 141. The electronic control unit 149 controls the operation of the actuator 141 according to the rotating speed of the engine, which is inputted from a sensor (not shown).

Again in FIGS. 1 and 2, an exhaust system 150 in connection with the engine E includes individual exhaust pipes 151, 151 individually connected to lower portions of a side wall on the front side of the cylinder head 86 of the engine main body 50, a pair of first collection exhaust pipes 152 for connecting a pair of the individual exhaust pipes 151, 151 in common, a single second collection exhaust pipe 153 to which the pair of first collection exhaust pipes 152 are connected and which has an intermediate portion with a first exhaust muffler 154 interposed therein, and a second exhaust muffler 155 connected to the downstream end of the second collection exhaust pipe 153.

The individual exhaust pipes 151, 151 are extended downwards from the front side of the engine main body 50, and the first collection exhaust pipes 152 are disposed to extend roughly in the front-rear direction on the lower side of the engine main body 50. In addition, the second collection exhaust pipe 153 rises while being curved so as extend from the lower side of the engine main body 50 toward the right side of the vehicle body, between the rear wheel WR and the engine main body 50, and is further extended rearwards on the upper side of the rear wheel WR. As a result, the first exhaust muffler 154 is interposed in the rising portion of the second collection exhaust pipe 153, and a rear end discharge portion of the exhaust system 150, i.e., a downstream end portion of the second exhaust muffler 155 is disposed on the upper side relative to the axle 68 of the rear wheel WR.

Figure 16:
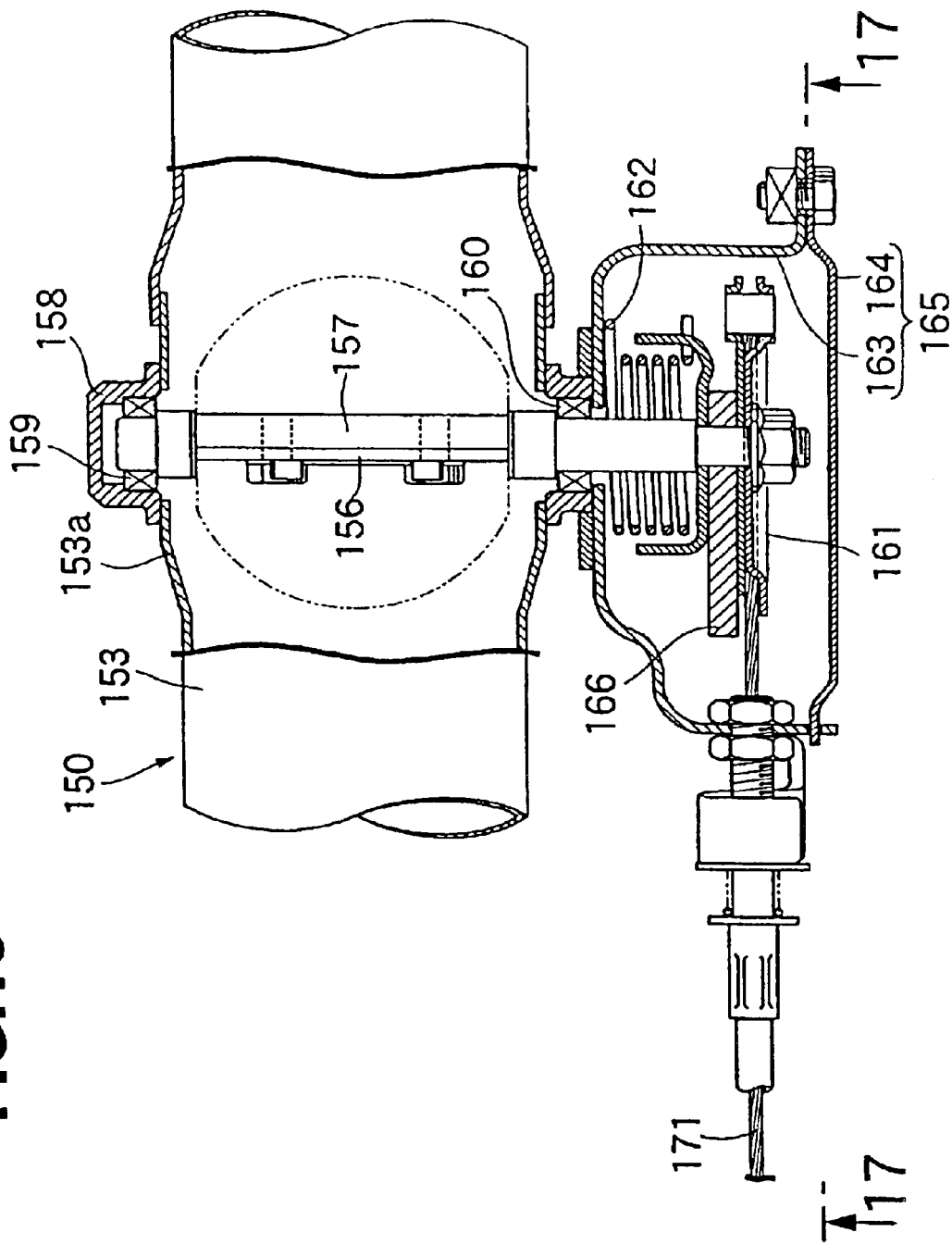
FIG. 16 is an enlarged sectional view taken along line 16—16 of FIG. 2.
Figure 17:
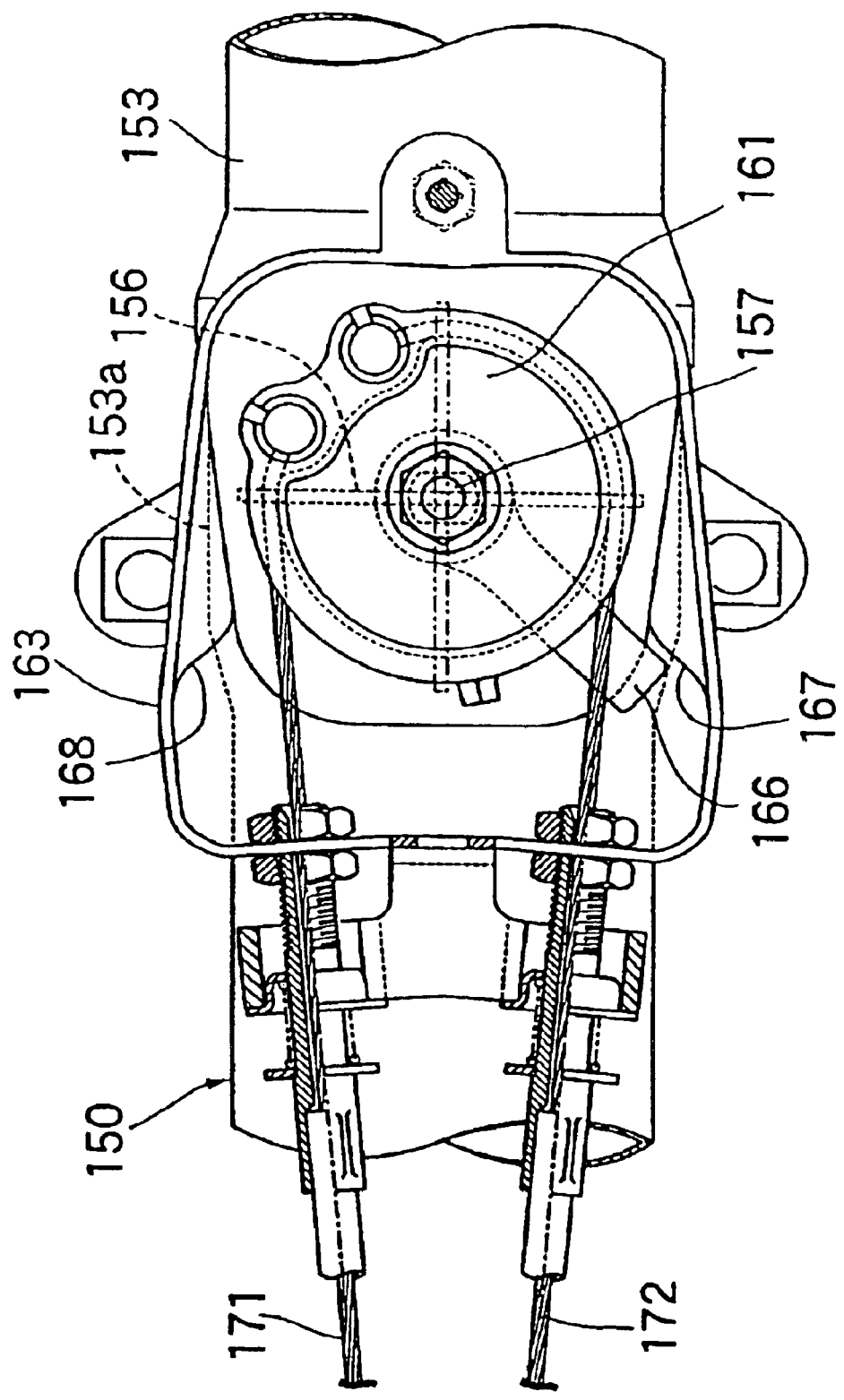
FIG. 17 is a sectional view taken along line 17—17 of FIG. 16.

Referring to FIGS. 16 and 17 also, the second collection exhaust pipe 153 constituting a part of the exhaust system 150 is provided with an enlarged-diameter portion 153a at its portion located on the front and upper side relative to the axle 68 of the rear wheel WR, and an exhaust control valve 156 for controlling the exhaust pulsation in the exhaust system 150 by varying the circulation area of the second collection exhaust pipe 153 according to the rotating speed of the engine E is disposed in the enlarged-diameter portion 153a.

The exhaust control valve 156 is operated to the closing side in order to contrive enhancement of the output of the engine E by utilizing an exhaust pulsation effect in the exhaust system 150 in low- and medium-speed rotation regions of the engine E, and is operated to the opening side in order to contrive enhancement of the output of the engine E by reducing the resistance to circulation of exhaust gas through the exhaust system 150 in a high-speed rotation region of the engine E. The exhaust control valve 156 is fixed to a valve shaft 157, which is turnably borne on the enlarged-diameter portion 153a of the second collection exhaust pipe 153.

One end of the valve shaft 157 is borne, through a seal member 159, on a bottomed hollow cylindrical bearing housing 158 attached to the enlarged-diameter portion 153a, and a driven pulley 161 is fixed to an other end portion of the valve shaft 157 projecting beyond the enlarged-diameter portion 153a, with a seal member 160 interposed between the valve shaft 157 and the enlarged-diameter portion 153a. A return spring 162 for biasing the valve shaft 157 toward the side of opening the exhaust control valve 156 is provided between the valve shaft 157 and the enlarged-diameter portion 153a.

Meanwhile, the projecting portion of the valve shaft 157 projecting beyond the enlarged-diameter portion 153a, the driven pulley 161, and the return spring 162 are contained in a case 165, which is composed of a bowl-shaped case main body 163 fixed to the enlarged-diameter portion 153a, and a lid plate 164 fastened to the case main body 163 so as to close the open end of the case main body 163.

Moreover, in the case 165, a restriction arm 166 having a tip end portion projecting beyond the outer circumference of the driven pulley 161 is fixed to the valve shaft 157. A closing-side stopper 167 for restricting the end of turning to the closing side of the valve shaft 157, namely, the exhaust control valve 156, by abutting the tip end portion of the restriction arm 166 thereon, and an opening-side stopper 168 for restricting the end of turning to the opening side of the valve shaft 157, namely, the exhaust control valve 156, by abutting the tip end portion of the restriction arm 166 thereon, are provided on the inside surface of the case main body 163 of the case 165.

One end portion of a second transmission wire 171 for operating the exhaust control valve 156 to the closing side at a pulling time is wrapped around and engaged with the driven pulley 161, and one end portion of a third transmission wire 172 for operating the exhaust control valve 156 to the opening side at a pulling time is wrapped around and engaged with the driven pulley 161. The other end portion of the second transmission wire 171 is wrapped around and engaged with the second wire groove 147 of the drive pulley 144 in the actuator 141, in a direction reverse to the wrapping direction of the first transmission wire 135, as shown in FIG. 15. The other end portion of the third transmission wire 172 is wrapped around and engaged with the third wire groove 148 of the drive pulley 144, in the same direction as the wrapping direction of the first transmission wire 135, as shown in FIG. 15.

That is to say, the actuator 141 for driving the exhaust control valve 146 controlled according to the rotating speed of the engine E is connected to the first intake control valve 126 in the intake duct 105 so as to drive the turning of the first intake control valve 126.

Meanwhile, the enlarged-diameter portion 153a of the second collection exhaust pipe 153 in which the exhaust control valve 156 is disposed is desirably disposed on the lower side of the main seat 90, in order to obviate as securely as possible the action of undesired external forces on the second and third transmission wires 171 and 172 from the upper side. Besides, the case 165 is disposed to be exposed to the exterior in side view, in order to facilitate impingement thereon of the running airflow.

The actuator 141 is desirably disposed on the rear upper side of the engine main body 50 at such a position that the distance between the actuator 141 and the valve shaft 128 in the intake duct 105 is substantially equal to the distance between the actuator 141 and the valve shaft 157 of the exhaust control valve 156. With this arrangement, it is possible to reduce obstacles present between the driven pulley 161 of the exhaust control valve 156 and the actuator 141, and to facilitate the laying of the second and third transmission wires 171 and 172 for connection between the driven pulley 161 and the actuator 141.

Figure 18:
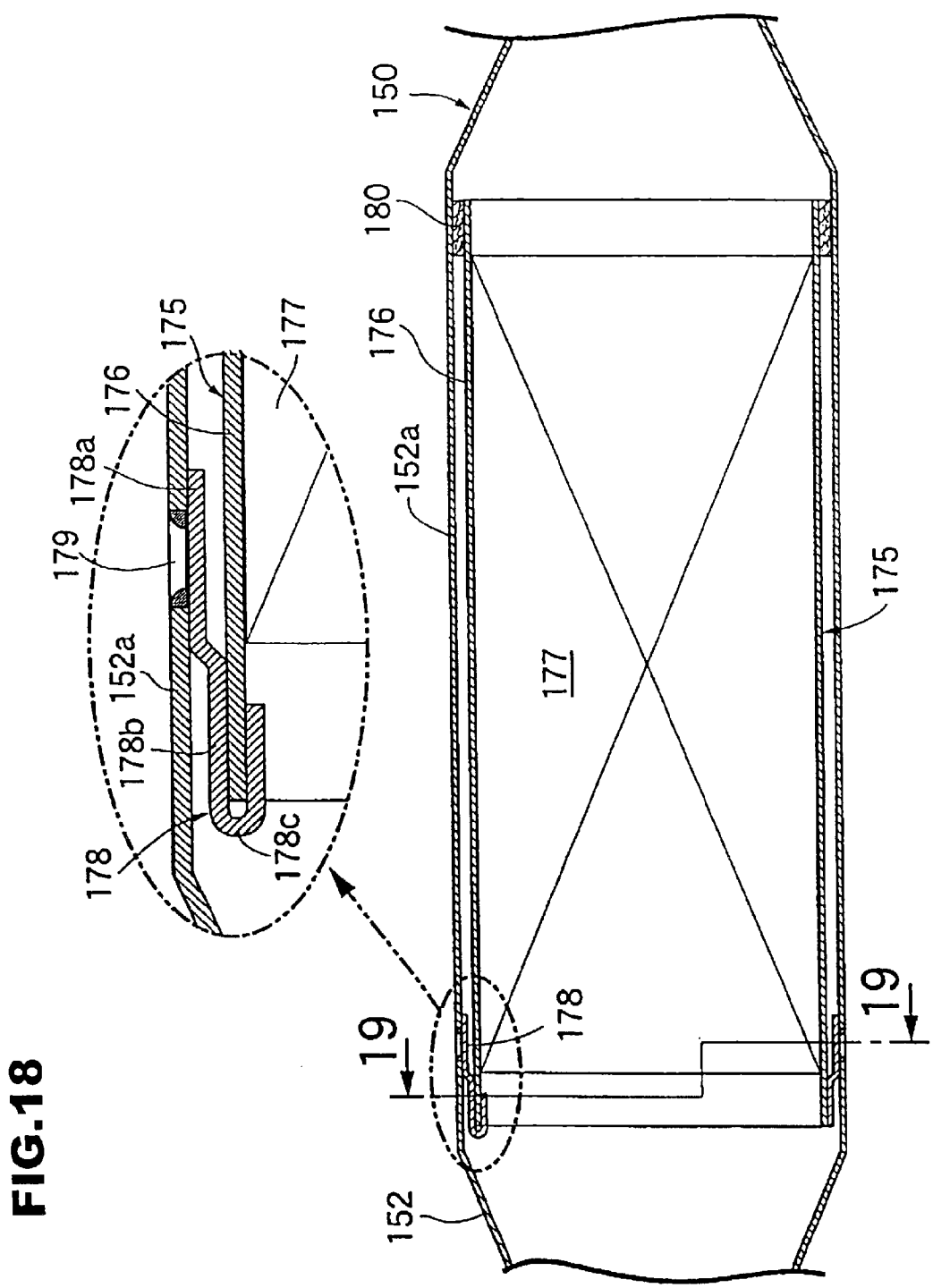
FIG. 18 is an enlarged sectional view taken along line 18—18 of FIG. 2.
Figure 19:
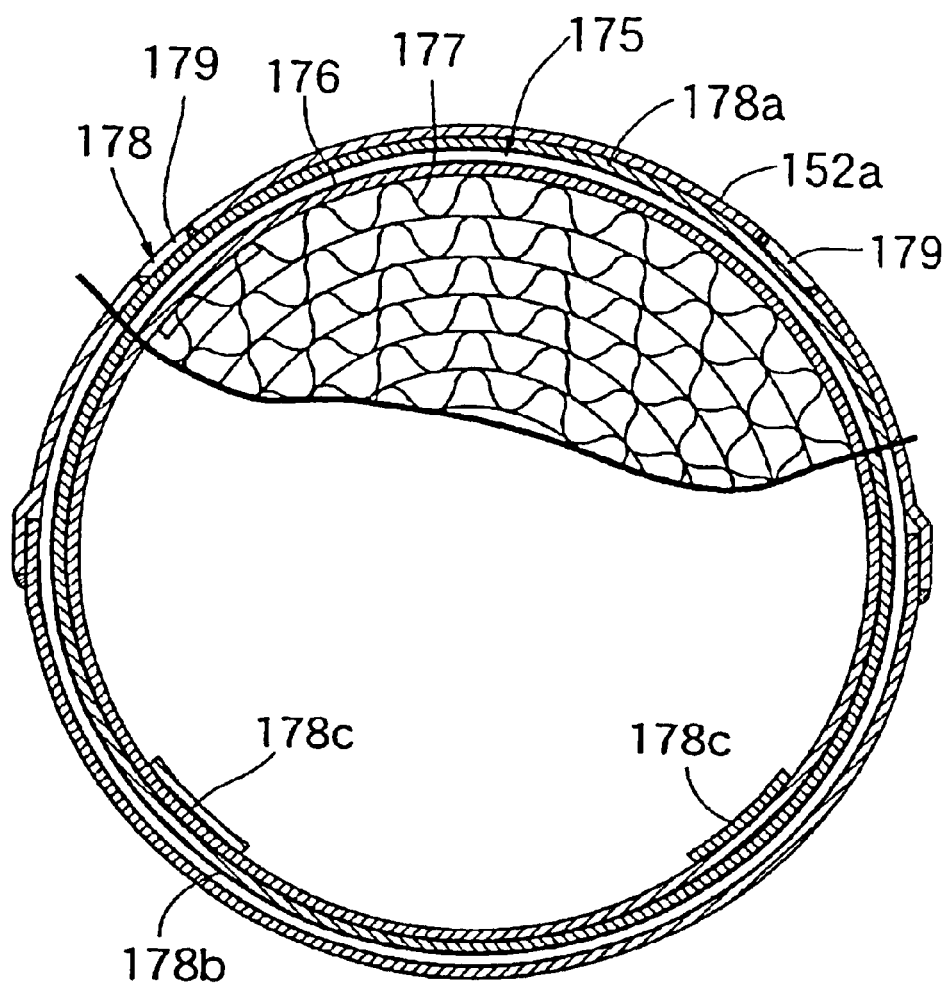
FIG. 19 is a sectional view taken along line 19—19 of FIG. 18.

In FIGS. 18 and 19, the first collection exhaust pipes 152 constituting parts of the exhaust system 150 are provided with enlarged-diameter portions 152a at their portions located on the lower side of the engine main body 50, and a catalyst body 175 is contained in the enlarged-diameter portions 152a. With the catalyst body 175 thus disposed on the lower side of the engine main body 50, an exhaust gas discharged from the cylinder head 86 can be circulated through the catalyst body 175 while keeping the exhaust gas at a comparatively high temperature.

The catalyst body 175 has a structure in which a catalyst carrier 177 formed in a cylindrical shape while permitting circulation of the exhaust gas is contained in a hollow cylindrical case 176, with one end thereof disposed on the inner side relative to one end of the case 176. The case 176 is formed of a material different from the material of the first collection exhaust pipe 152. For example, the first collection exhaust pipe 152 is made of titanium, whereas the case 176 and the catalyst carrier 177 of the catalyst body 175 are made of stainless steel.

A bracket 178 formed of the same material as that of the first collection exhaust pipe 152, for example, titanium, is welded to the inner circumferential surface of the enlarged-diameter portion 152a of the first collection exhaust pipe 152. The bracket 178 integrally includes a large ring portion 178a fitted in the enlarged-diameter portion 152a in the state of surrounding one end portion of the case 176, a small ring portion 178b, which is continuous with the large ring portion 178a and in which one end of the case 176 is fitted, and extended arm portions 178c, 178c extended to the opposite side of the large ring portion 178a from a plurality of locations of the small ring portion 178b, for example, from four locations spaced at regular intervals along the circumferential direction.

The enlarged-diameter portion 152a is provided with peep holes 179 at a plurality of locations along the circumferential direction thereof so that the outer circumferential surface of the large ring portion 178a fronts on the peep holes 179, and the large ring portion 178a is welded to the enlarged-diameter portion 152a at the peep holes 179, whereby the bracket 178 is welded to the enlarged-diameter portion 152a of the first collection exhaust pipe 152. In addition, the extended arm portions 178c, 178c are caulked to one end of the case 176 of the catalyst carrier 175, and thus, the bracket 178 welded to the enlarged-diameter portion 152a of the first collection exhaust pipe 152 is caulked to one end of the case 176 at its portion projecting beyond one end of the catalyst carrier 177.

Besides, a ring 180 composed of stainless steel mesh is attached, by spot welding, to the outside surface of the other end of the case 176 of the catalyst body 175. With the ring 180 interposed between the enlarged-diameter portion 152a of the first collection exhaust pipe 152 and the other end portion of the case 176, the other end side of the catalyst body 175 fixed to the enlarged-diameter portion 152a through the bracket 178 on one side thereof can slide under thermal expansion, whereby a stress due to thermal expansion of the catalyst body 175 can be prevented from acting between the one end portion of the catalyst body 175 and the enlarged-diameter portion 152a.

Again in FIG. 1, the front side of the head pipe 22 is covered with a front cowl 181 formed of a synthetic resin, both sides of a front portion of the vehicle body are covered with a synthetic resin-made center cowl 182 continuous with the front cowl 181, and a synthetic resin-made lower cowl 183 for covering the engine main body 50 from both sides is provided in connection with the center cowl 182. Besides, rear portions of the seat rails 30 are covered with a rear cowl 184.

A front fender 185 for covering the upper side of the front wheel WF is attached to the front fork 21, and a rear fender 186 for covering the upper side of the rear wheel WR is attached to the seat rails 30.

Next, functions of this embodiment will be described. The first cross pipe 27 is bridgingly disposed between front portions of the left-right pair of main frames 23, 23 provided to be continuous with the head pipe 22 at the front end of the vehicle body frame F. In this case, the inside walls of the front portions of both the main frames 23, 23 are coaxially provided with the mount holes 32, and both end portions of the first cross pipe 27 passed through the mount holes 32 are welded to the inside walls of both the main frames 23, 23. Therefore, by varying the amounts of insertion of both end portions of the first cross pipe 27 into the mount holes 32, it is possible to absorb dimensional errors between the left-right pair of main frames 23, 23 and an error in the axial length of the first cross pipe 27, and to securely weld both end portions of the first cross pipe 27 to the inside walls of the main frames 23, 23.

In addition, the head pipe 22 integrally includes the hollow cylindrical portion 22a for steerably bearing the front fork 21, and the left-right pair of gussets 22b, 22b extending rearwardly downwards from the hollow cylindrical portion 22a. The main frames 23 include at least the gussets 22b, and the pipe members 31 welded respectively to the gussets 22b. Both the gussets 22b are integrally provided with the extended portions 22c extended rearwards so as to be disposed on the inner side relative to the inside walls of front portions of the pipe members 31, in the manner of constituting an inside wall of a front portion of the main frame 23. Moreover, both the extended portions 22c are provided with the mount holes 32 for passing therethrough both end portions of the first cross pipe 27 so as to set both ends facing the inside walls of front portions of the pipe members 31, and both end portions of the first cross pipe 27 are welded to the outside surfaces of both the extended portions 22c. That is to say, both end portions of the first cross pipe 27 are welded to the outside surfaces of the extended portions 22c integral with the gussets 22b constituting parts of both main frames 23, so that welding of the first cross pipe 27 to the main frames 23 is facilitated, and the welded portions cannot be seen from the exterior, resulting in a good appearance.

In addition, the pipe member 31 is formed in a vertically elongate angular tubular shape having the inside wall 31a, which is flat over substantially the whole vertical length thereof, and the outside wall 31b, which is substantially parallel to the inside wall 31a, and the pipe member 31 is bent in a plain surface PL orthogonal to the inside wall 31a, so that bending of the pipe member 31 is easy to carry out.

Moreover, both the pipe members 31, 31 are so inclined that they become closer to each other as their upper portions are approached, and are made continuous with the gussets 22b, 22b of the head pipe 22. Therefore, with the simple structure in which the pipe members 31, 31 are thus inclined, it is possible to enlarge the space between lower portions of both the pipe members 31, 31, to thereby secure a sufficient space for arrangement of the engine E, and to narrow the space between upper portions of both the pipe members 31, 31, thereby ensuring that the knees of the rider would not easily make contact with the pipe members 31, 31.

In supporting the engine main body 50 by upper portions and lower portions of the pivot plates 26, 26 of the vehicle body frame F, the pivot plate 26 on one side is provided with the passing hole 53 for passing the mount bolt 52 therethrough and with the first locking portion 54 surrounding the outer end of the passing hole 53 so as to permit engagement therewith of the enlarged-diameter head portion 52a provided at one end of the mount bolt 52, whereas the pivot plate 26 on the other side is provided with the screw hole 57 coaxial with the passing hole 53 and with the second locking portion 58 surrounding the outer end of the screw hole 57. The hollow cylindrical bolt 60 is screw-engaged with the screw hole 57 so as to clamp the engine main body 50 between one end thereof and the inside surface of the pivot plate 26 on one side and to locate the other end thereof on the inner side relative to the second locking portion 58. In addition, the nut 63 capable of being engaged with the second locking portion 58 is screw-engaged with the other end portion of the mount bolt 52 passed through the passing hole 53, the engine main body 50, the hollow cylindrical body 60, and the screw hole 57 and projecting from the screw hole 57.

With such a structure for supporting the engine main body 50 on the vehicle body frame F, by regulating the screw engagement position of the hollow cylindrical bolt 60 to the screw hole 57, it is possible to securely clamp the engine main body 50 between the pivot plate 26 on one side and one end of the hollow cylindrical bolt 60 while absorbing dimensional errors present between both the pivot plates 26, 26 and an error in the width direction dimension of the engine main body 50. Moreover, since the enlarged-diameter head portion 52a at one end of the mount bolt 52 is engaged with the first locking portion 54 of the pivot plate 26 on one side and the nut 63 screw-engaged with the other end portion of the mount bolt 52 is engaged with the second locking portion 58 of the pivot plate 26 on the other side, it is possible to fasten both ends of the mount bolt 52 to the vehicle body frame F in such a manner as to firmly determine the axial positions of both ends, and to enhance the rigidity in supporting the engine main body 50.

In addition, since the hollow cylindrical stop bolt 61 making contact with the other end of the hollow cylindrical bolt 60 is screw-engaged with the screw hole 57 so as to be located on the inner side relative to the second locking portion 58, it is possible to bring the stop bolt 61 into contact with the other end surface of the hollow cylindrical bolt 60, thereby effectively preventing the hollow cylindrical bolt 60 from slackening.

The intake passage portion 92 extending rectilinearly so as to guide cleaned air from the air cleaner 87 disposed on the upper side of the cylinder head 86 is connected to an upper portion side wall of the cylinder head 50, the first injector 100 for injecting the fuel into the intake passage portion 92 from the upper side is attached to the cleaner case 96 of the air cleaner 87, and the fuel tank 88 is so disposed as to cover a rear portion and an upper portion of the air cleaner 87. In this case, the first injector 100 is disposed on the front side relative to the center line C1 of the intake passage portion 92.

That is to say, the first injector 100 is disposed at a position set off to the front side from the center line C1 of the intake passage portion 92, resulting in that, on the center line C1 of the intake passage portion 92, the bottom wall of the fuel tank 88 can be set in a comparatively low position while obviating interference with the first injector 100, so that it is possible to secure a sufficient capacity of the fuel tank 88.

Besides, since the first injector 100 is disposed on the front side relative to the center line C2 of the oil supply port 101 provided in a front portion of the fuel tank 88 and on the center line C2 of the oil supply port 101, the first injector 100 does not interfere with the fuel tank 88, it is possible to set the oil supply port 101 at a further lower position. In addition, the first injector 100 is attached to the cleaner case 96 of the air cleaner 87 so that, on the projection onto a plain surface parallel to the center line C2 of the oil supply port 101 and the center line C1 of the intake passage portion 92, an upper portion thereof is disposed on the front side relative to the intersection P of both the center lines C1 and C2. Therefore, it is possible to set the bottom wall of the fuel tank 88 at a further lower position on the front side relative to the center line C2 of the oil supply port 101, to secure further sufficient capacities of the fuel tank 88 and the air cleaner 87, and to facilitate insertion of an oil supply nozzle at the time of supplying the oil.

Furthermore, since the second injector 103 for injecting the fuel into the intake passage portion 92 is attached to a rear side portion of the throttle body 94 of the intake passage portion 92, the first injector 100 for injecting the fuel into the intake passage portion 92 from the upper side in order to contrive to enhancement of the output of the engine E so as to supply the fuel at a comparatively low temperature and the second injector 103 capable of injecting the fuel with good response to the operation of the engine E can be disposed while utilizing the arrangement space of the intake passage portion 92 effectively and with good balance.

The intake duct 105 extending forwards from the air cleaner 87 disposed at the head pipe 22 provided at the front end of the vehicle body frame F is disposed on the lower side of the head pipe 22. In this case, the first intake passage 119 whose central portion in the width direction is disposed on the center line C3 in the width direction of the front wheel WF and the left-right pair of second intake passages 120 disposed on both sides of the first intake passage 119 are formed in the intake duct 105 so that the circulation area of the first intake passage 119 is greater than the total circulation area of the pair of second intake passages 120. Besides, the first intake control valve 126 for closing the first intake passage 119 at the time of low-speed rotation of the engine E is disposed in the first intake passage 119 so as to open the first intake passage 119 at the time of high-speed rotation of the engine E.

Such a constitution of the intake duct 105 ensures that, at the time of low-speed operation of the engine E, i.e., when the motorcycle is run at a low speed because water and foreign matter are easily lifted from the road surface due to the condition of the road surface, the first intake passage 119 whose central portion in the width direction is disposed on the center line C3 in the width direction of the front wheel WF is closed, so that penetration of water or foreign matter into the air cleaner 87 can be prevented as securely as possible. In addition, at the time of high-speed rotation of the engine E, water and foreign matter would not be easily lifted from the road surface by the backward running airflow, so that penetration of water or foreign matter into the air cleaner 87 can be prevented as securely as possible; further, since the first intake passage 119 having a large circulation area is opened, a comparatively large quantity of air can be introduced into the air cleaner 87, thereby contributing to enhancement of the engine output.

The first intake control valve 126 is fixed to the valve shaft 128 turnably borne on the intake duct 105. Besides, the second intake control valves 127 for varying the circulation areas of the second intake passages 120 are fixed to the valve shaft 128 in such a manner as to open the second intake passages 120 at the time of low-speed rotation of the engine E and to close the second intake passages 120 at the time of high-speed rotation of the engine E.

Such a control of the opening and closing of the first intake control valve 126 and the second intake control valves 127 results in the following. With the intake quantity restricted to a small value at the time of low-speed operation of the engine E, it is possible to restrain the mixture gas from becoming lean, even at the time of an accelerating operation, and to supply the engine E with an appropriate rich mixture gas, thereby obtaining a good acceleration performance. Besides, at the time of high-speed operation of the engine E, it is possible to reduce the intake resistance, and thereby to enhance the volume efficiency of the engine E, contributing to enhancement of the high-speed output performance. Moreover, by driving the turning of the valve shaft 128, it is possible to drive the opening and closing of the first intake control valve 126 and the pair of second intake control valves 127; therefore, the structure is simplified.

In addition, the baffle plates 122a disposed at positions spaced from the front end opening portions 120a of the second intake passages 120 so as to form gaps between themselves and the front end opening portions 120a are attached to the intake duct 105. When outside air is being introduced through the second intake passages 120 into the air cleaner 87, the labyrinth structure provided by the baffle plates 122a makes it possible to obviate, as securely as possible, water or foreign matter from penetrating into the second intake passages 120.

Moreover, the front end of the first intake passage 119 is opened to the front side at the front end of the intake,duct 105, and the front end opening portions 120a of the second intake passages 120 are formed at a front end portion of the intake duct 105 so as to open in directions different from the opening direction of the front end of the first intake passage 119. Therefore, at the time of high-speed rotation of the engine E, the running airflow can be efficiently introduced into the first intake passage 119 to thereby enhance the intake efficiency, and at the time of low-speed rotation of the engine E, it is possible to ensure that foreign matter and water would not easily enter the second intake passages 120 into which air is introduced.

Besides, the front end portion of the intake duct 105 is formed in a roughly triangular shape with its upper edges along the lower end edges of connection portions between the head pipe 22 and both the main frames 23 and with its lower end portion along an upper portion of the radiator 89 disposed on the lower side of the intake duct 105, as viewed from the front side. Therefore, the intake duct 105 can be effectively disposed in the space between the connection portions of the head pipe 22 and both main frames 23 and the radiator 89, while keeping large the opening portion at the front end portion of the intake duct 105.

Moreover, the actuator 141 mounted on the motorcycle for driving the exhaust control valve 156, which is controlled according to the rotating speed of the engine E, is connected to the first and second intake control valves 126 and 127 so as to drive the opening and closing of the first and second intake control valves 126 and 127. Therefore, the first and second intake control valves 126 and 127 can be driven while obviating an increase in the number of component parts and contriving compactness of the intake system and a reduction in the weight of the intake system.

Meanwhile, the first intake control valve 126 is fixed to the valve shaft 128 turnably borne on the intake duct 105 while having its axis orthogonal to the air circulation direction circulated through the first intake passage 119, in such a manner as to be inclined rearwardly upwards in the condition where the first intake passage 119 is closed. This constitution is advantageous to prevention of the penetration of water or foreign matter to the side of the air cleaner 87. Specifically, while water and foreign matter kicked up by the front wheel WF are liable to enter to the upper side in the front end opening portion of the first intake passage 119, when the operation from the valve-closing state to the valve-opening state of the first intake control valve 126 is started, the foreign matter and water kicked up would easily collide against the first intake control valve 126 even when entering into the front end opening portion of the first intake passage 119, so that the foreign matter and water can be restrained from passing through the first intake control valve 126 into the air cleaner 87.

Furthermore, the first intake control valve 126 is so formed that, in the valve-closing state thereof, the area of its portion on the upper side relative to the valve shaft 128 is greater than the area of its portion on the lower side relative to the valve shaft 128. This structure is further advantageous to prevention of the penetration of foreign matter into the first intake passage 119.

Meanwhile, the axle 68 of the rear wheel WR is rotatably borne on the rear end of the swing arm 66 having a front end portion oscillatably borne on the vehicle body frame F, the rear end discharge portion of the exhaust system 150 connected to the cylinder head 86 possessed by the engine main body 50 mounted on the vehicle body frame F on the front side relative to the rear wheel WR is disposed at a position higher than the axle 68, and the exhaust control valve 156 for regulating the circulation area in the second collection exhaust pipe 153 constituting a part of the exhaust system 150 is disposed in the second collection exhaust pipe 153. In this case, the exhaust control valve 156 is disposed on the front side and on the upper side relative to the axle 68 of the rear wheel WR.

Such an arrangement of the exhaust control valve 156 ensures that the exhaust control valve 156 can be disposed at such a position as to be less susceptible to influences of the rear wheel WR and to be spaced from the grounding surface of the rear wheel WR; therefore, the exhaust control valve 156 can be disposed under good environments such that the operation of the exhaust control valve 156 is free of bad influences of the rear wheel WR and the grounding surface.

In addition, in fixing the catalyst body 175, which has the hollow cylindrical case 176 formed of a material different from the material of the first collection exhaust pipe 152 constituting a part of the exhaust system 150 and which is contained in the first collection exhaust pipe 152, to the first collection exhaust pipe 152, the bracket 178 made of the same material as the first collection exhaust pipe 152 is welded to the inner circumferential surface of the enlarged-diameter portion 152a of the first collection exhaust pipe 152, and the bracket 178 is caulked to the case 176 of the catalyst body 175.

Therefore, even in the case where the case 176 of the catalyst body 175 and the first collection exhaust pipe 152 are made of different materials, the catalyst body 175 can be contained in and fixed to the first collection exhaust pipe 152. This makes it possible to increase the degree of freedom in selecting the materials for the case 176 of the catalyst body 175 and the first collection exhaust pipe 152.

Moreover, the catalyst body 175 includes the catalyst carrier 177, which is formed in a cylindrical shape while permitting circulation of the exhaust gas and which is contained in the hollow cylindrical case 176, while having one end thereof disposed on the inner side relative to one end of the case 176, and the bracket 178 is caulked to one end of the case 176 at its portion projecting beyond one end of the catalyst carrier 177. Therefore, the catalyst body 175 can be fixed to the first collection exhaust pipe 152, without influencing the catalyst carrier 177.

Moreover, the catalyst body 175 not having any movable portion is disposed on the lower side of the engine E in the exhaust system 150, whereas the exhaust control valve 156 including a movable portion is disposed on the rear upper side of the engine E in the exhaust system 150. Therefore, it is possible to space the catalyst body 175 and the exhaust control valve 156 from each other in the exhaust system 150, and thereby to restrain bad influences of the heat coming from the catalyst body 175 from being exerted on the exhaust control valve 156.

While one embodiment of the present invention has been described above, the present invention is not limited to the above embodiment, and various design modifications are possible without departing from the scope of the present invention as defined by the claims.

For example, while the motorcycle has been described in the above embodiment, the present invention is widely applicable in relation to small-type vehicles such as motorcycles, motor tricycles, etc.

What is claimed is:

1. A fuel injection system for an engine in a small-type vehicle comprising:
    a cylinder head for an engine main body mounted on a vehicle body frame,
    an intake passage portion extending rectilinearly so as to guide cleaned air from an air cleaner disposed on an upper side of said cylinder head, said intake passage portion being connected to an upper portion side wall of said cylinder head,
    an injector for injecting a fuel into said intake passage portion from the upper side of a throttle valve, said injector being attached to said air cleaner, said throttle valve is incorporated in the intake passage portion, and
    a fuel tank so disposed as to cover a rear portion and an upper portion of said air cleaner,
    wherein said injector is disposed on a front side relative to the center line of said intake passage portion.

2. The fuel injection system for an engine in a small-type vehicle as set forth in claim 1, wherein said injector is disposed on the front side relative to the center line of an oil supply port provided at a front portion of said fuel tank.

3. The fuel injection system for an engine in a small-type vehicle as set forth in claim 2, wherein said injector is mounted to said air cleaner so that, on the projection onto a plain surface parallel to said center line of said oil supply port and said center line of said intake passage portion, an upper portion of said injector is disposed on the front side relative to the intersection of said center lines.

4. The fuel injection system for an engine in a small-type vehicle as set forth in claim 1, wherein a second injector for injecting the fuel into said intake passage portion is attached to a rear side portion of said intake passage portion.

* * * * *